US009933338B2

(12) United States Patent
Noda et al.

(10) Patent No.: US 9,933,338 B2
(45) Date of Patent: Apr. 3, 2018

(54) HEALTH MANAGEMENT SYSTEM, FAULT DIAGNOSIS SYSTEM, HEALTH MANAGEMENT METHOD, AND FAULT DIAGNOSIS METHOD

(71) Applicants: Hitachi Power Solutions Co., Ltd., Ibaraki (JP); Tsuru Educational Foundation, Hiroshima (JP)

(72) Inventors: Toujirou Noda, Hitachi (JP); Tadashi Suzuki, Hitachi (JP); Naoki Miyakoshi, Hitachi (JP); Toshiaki Kobari, Hitachi (JP); Shouzou Miyabe, Hitachi (JP); Hisae Shibuya, Tokyo (JP); Shunji Maeda, Hiroshima (JP)

(73) Assignees: HITACHI POWER SOLUTIONS CO., LTD., Ibaraki (JP); TSURU EDUCATIONAL FOUNDATION, Hiroshima (JP)

( * ) Notice: Subject to any disclaimer, the term of this patent is extended or adjusted under 35 U.S.C. 154(b) by 287 days.

(21) Appl. No.: 14/528,008

(22) Filed: Oct. 30, 2014

(65) Prior Publication Data

US 2015/0160098 A1 Jun. 11, 2015

(30) Foreign Application Priority Data

Nov. 1, 2013 (JP) ................. 2013-227838

(51) Int. Cl.
*G01B 5/28* (2006.01)
*G01M 99/00* (2011.01)
*G05B 23/02* (2006.01)

(52) U.S. Cl.
CPC ........... *G01M 99/00* (2013.01); *G05B 23/024* (2013.01); *G05B 23/0281* (2013.01); *G05B 23/0283* (2013.01)

(58) Field of Classification Search
CPC . G01M 99/00; G05B 23/024; G05B 23/0281; G05B 23/0283; G06F 11/3409
(Continued)

(56) References Cited

U.S. PATENT DOCUMENTS

2003/0120402 A1* 6/2003 Jaw ..................... G01M 15/00
702/182
2005/0209820 A1 9/2005 Inoue et al.
(Continued)

FOREIGN PATENT DOCUMENTS

EP 2477086 A1 7/2012
JP 2010-191556 A 9/2010
(Continued)

OTHER PUBLICATIONS

K. Goebel et al., "Prognostics in Battery Health Management," IEEE Instrumentation & Measurement Magazine, vol. 11, No. 4, pp. 33-40, Aug. 2008.
(Continued)

*Primary Examiner* — Stephanie Bloss
(74) *Attorney, Agent, or Firm* — Baker Botts L.L.P.

(57) ABSTRACT

An objective is to identify the health state of mechanical equipment and provide information usable for determining maintenance work timing or the like. A health management system includes a time-series data acquisition unit configured to acquire multi-dimensional sensor data and environmental data from mechanical equipment; a first discrimination unit configured to quantify the equipment state of the mechanical equipment by a statistical method using normal data as learning data; a second discrimination unit configured to quantify the health state indicating the performance or quality of the mechanical equipment by a statistical
(Continued)

method using normal data; and an output unit configured to display and/or output to the outside the quantified equipment state and health state.

10 Claims, 22 Drawing Sheets

(58) Field of Classification Search
USPC .......................................................... 702/35
See application file for complete search history.

(56) References Cited

U.S. PATENT DOCUMENTS

| 2008/0082181 | A1* | 4/2008 | Miller | G05B 23/021 |
| | | | | 700/30 |
| 2009/0326890 | A1* | 12/2009 | Shetty | G05B 17/02 |
| | | | | 703/7 |
| 2012/0041575 | A1* | 2/2012 | Maeda | G05B 23/024 |
| | | | | 700/80 |
| 2012/0316835 | A1 | 12/2012 | Maeda et al. | |
| 2013/0282336 | A1* | 10/2013 | Maeda | G05B 23/0229 |
| | | | | 702/184 |
| 2014/0279795 | A1* | 9/2014 | Shibuya | G05B 23/0254 |
| | | | | 706/46 |

FOREIGN PATENT DOCUMENTS

| JP | 2011-145846 A | 7/2011 |
| WO | WO 2013/030984 A1 | 3/2013 |
| WO | WO 2013/111397 A1 | 8/2013 |
| WO | WO 2013/155421 A1 | 10/2013 |

OTHER PUBLICATIONS

Y. Wang et al., "Health Monitoring of Hard Disk Drive Based on Mahalanobis Distance," Prognostics & System Health Management Conference (PHM-Shenzhen), 2011.

F. Camci et al., "Methodologies for Integration of PHM Systems with Maintenance Data," Aerospace Conference, IEEE, pp. 1-9, 2007.

S. Ozaki et al., Conference Report, "Connection between Gaussian Processes and Similarity Baed Modeling for Anomaly Detection," Pattern Recognition and Media Understanding (PRMU), Image Engineering (IE), pp. 133-138, May, 2011 (English translation of abstract attached).

T. Higuchi, "Particle Filter," The Journal of the Institute of Electronics, Information and Communication Engineers, vol. 88, No. 12, pp. 989-994, 2005 (English translation of abstract attached).

Office Action, dated Dec. 10, 2013, which issued during the prosecution of Japanese Patent Application No. 2013-227838, which corresponds to the present application (English translation attached).

Extended European Search Report, dated Mar. 18, 2015, which issued during the prosecution of European Patent Application No. 14190744.4, which corresponds to the present application.

* cited by examiner

FIG. 16

SIMILARITY MATRIX

|  |  | EQUIPMENT STATE CLUSTER | | | | |
|---|---|---|---|---|---|---|
|  |  | $S_1$ | $S_2$ | $S_3$ | ... | $S_N$ |
| HEALTH STATE CLUSTER | $P_1$ | | | | | |
| | $P_2$ | | | | | |
| | $P_3$ | | | | | |
| | ⋮ | | | | | |
| | $P_M$ | | | | | |

SIMILARITY

FIG. 19

| TYPE | DIAGRAM OF SCHEME |
|---|---|
| PRINCIPAL COMPONENT ANALYSIS | |
| INDEPENDENT COMPONENT ANALYSIS | |
| WAVELET TRANSFORM | |

HEALTH MANAGEMENT SYSTEM, FAULT DIAGNOSIS SYSTEM, HEALTH MANAGEMENT METHOD, AND FAULT DIAGNOSIS METHOD

CROSS-REFERENCE TO RELATED APPLICATION

This application claims benefit of priority to Japanese Patent Application No. 2013-227838, filed on Nov. 1, 2013, which is incorporated by reference herein in its entirety.

TECHNICAL FIELD

The present invention relates to a health management system and health management method of mechanical equipment for identifying the relationship between the health state of the mechanical equipment and the performance/quality level thereof, and to a fault diagnosis system and a fault diagnosis method of mechanical equipment for predicting the health state and the performance/quality level of the mechanical equipment.

BACKGROUND ART

In various types of mechanical equipment, such as construction machines, medical devices, wind, solar, thermal and other kinds of power stations, and water treatment equipment, and plants, regular maintenance is carried out to prevent in advance a decreased operating rate caused by faults of mechanical equipment, or adverse effects on customers, such as unachieved final specifications due to deteriorated performance or quality, and lack of reliability. However, even through mechanical equipment is maintained regularly, the mechanical equipment unavoidably goes down or deteriorates in performance due to failures. For this reason, early detection of faults (fault sign detection) and early identification of fault parts (fault diagnosis) using data from sensors attached to mechanical equipment are important concepts as a matter of course, and monitoring (observing) the performance and quality using the above data is becoming an increasingly important concept.

However, from a large variety of sensor data and huge volumes of mechanical equipment information and maintenance history information, it is a challenging task to predict how long the mechanical equipment will operate without failures and what level of quality the mechanical equipment can keep (the remaining useful life of the equipment) by identifying the health state of the mechanical equipment and by further monitoring the performance and quality thereof. This is because such prediction requires both design knowledge and field knowledge and large volumes of data analysis and entails high difficulties.

For example, Patent Literature 1 describes a fault detection method for detecting a fault of a plant or facility at an early stage, wherein the method comprises acquiring data from multiple sensors and detecting a fault of observation data on the basis of the similarity between data sets.

Meanwhile, Patent Literature 2 describes a fault detection method for detecting a fault of a plant or facility at an early stage, the method including: acquiring data from multiple sensors; modeling learning data substantially consisting of normal data; calculating a fault measure of acquired data using the modeled learning data; modeling the time-series behavior of the acquired data by linear prediction; calculating a prediction error from the model; and detecting the presence of a fault using both the fault measure and the prediction error.

Non-Patent Literature 1 has proposed a technique for evaluating the remaining useful life (RUL) of lithium-ion batteries. This technique employs the Gaussian process which is a nonlinear regression procedure (see, for example, Non-Patent Literature 4) or a particle method (see, for example, Non-Patent Literature 5). Since the deterioration mechanism of lithium-ion batteries can be expressed with a relatively simple physical model and the parameters of the model can be determined from sensor data, this technique can obtain the RUL without facing major obstacle.

Non-Patent Literature 2 has proposed a diagnosis method for a hard disk drive. This method employs a classic technique, such as Mahalanobis distance, instead of the Gaussian process because hard disk drives have more various deterioration mechanisms than lithium-ion batteries.

In Prognostics and Health Management (PHM), RUL calculation is considered important. Non-Patent Literature 3 has provided agent software of integrating different types of information related to the RUL for aircrafts or the like.

CITATION LIST

Patent Literatures

[Patent Literature 1] Japanese Patent Application Laid-Open No. 2010-191556
[Patent Literature 2] Japanese Patent Application Laid-Open No. 2011-145846

Non-Patent Literatures

[Non-patent Literature 1] K. Goebel, Prognostics in Battery Health Management, IEEE Instrumentation and Measurement Magazine, Vol. 11, 4, pp. 33-40 (2008).
[Non-patent Literature 2] Yu Wang, QiangMiao, Pecht, M., Health monitoring of hard disk drive based on Mahalanobis distance, Prognostics and System Health Management Conference (PHM-Shenzhen), 2011.
[Non-patent Literature 3] Camci, F., Valentine, G. S., Navarra, K., Methodologies for Integration of PHM Systems with Maintenance Data, Aerospace Conference, 2007 IEEE.
[Non-patent Literature 4] Conference report, "Shinsaku Ozaki, Toshikazu Wada, Shunji Maeda, Hisae Shibuya, "Connection between Gaussian Processes and Similarity Based Modeling for Anomaly Detection," Pattern Recognition and Media Understanding (PRMU), Image engineering (IE), 133-138, (2011. May).
[Non-patent Literature 5] Tomoyuki Higuchi, Particle filter, The Journal of the Institute of Electronics, Information and Communication Engineers, Vol. 88, No. 12, 2005.

SUMMARY OF INVENTION

Technical Problem

As described above, as compared with lithium-ion batteries whose deterioration mechanism can be expressed with a relatively simple physical model, hard disk drives have various deterioration mechanisms, which make it difficult to apply the advanced Gaussian process or particle method.

Non-Patent Literatures 1 to 3 describe the techniques all using the RULs defined as representing the time until mechanical equipment breaks down, and involving models in which the health state of the mechanical equipment decreases gradually and monotonically.

In general, the deterioration mechanism of mechanical equipment, such as construction machines, medical devices, wind, solar, thermal and other kinds of power stations, and plants, is rarely expressed with high accuracy because of their large system, and the necessity of large cost and long time for construction of computer models including the features of purchased parts. For these reasons, fault detection itself often relies on simple statistical modeling. Accordingly, in aforementioned case, the calculation of the remaining useful life (RUL) of the mechanical equipment can be said to be extremely difficult. Therefore, the timing appropriate for next maintenance work cannot be exactly specified. After all, the fact is that maintenance is scheduled maintenance, in which the maintenance work is carried out on predetermined schedule.

The fault detection techniques described in Patent Literatures 1 and 2 both involve detecting a fault sign before mechanical equipment breaks down. However, for mechanical equipment having various deterioration mechanisms, there has been no technique of estimating the performance or quality or predicting the RUL from the viewpoint of the performance or quality.

Therefore, an object of the present invention is to identify the health state of mechanical equipment by constructing a statistic model of the mechanical equipment with normal data and provide information usable for determining maintenance work timing or doing the like.

Solution to Problem

In order to solve the above-mentioned problems, a health management system of the present invention is a health management system of monitoring the health state of mechanical equipment, the system including: a time-series data acquisition unit configured to acquire, as time-series data, sensor data from multiple sensors installed in the mechanical equipment, or the sensor data and environmental data indicating an installation environment of the mechanical equipment; a state quantification unit configured to quantify an equipment state of the mechanical equipment and a health state indicating the performance or quality of the mechanical equipment by a statistical method using as learning data normal data which is the time-series data acquired when the mechanical equipment is in the normal state; and an output unit configured to display and/or output to the outside the quantified equipment state and the quantified health state.

Advantageous Effect of Invention

According to the present invention, the equipment state and health state of mechanical equipment are provided in the quantified form, which enables easy identification of the relationship between the equipment state and the health state such as performance or quality to properly determine the maintenance work timing of the mechanical equipment and the like.

BRIEF DESCRIPTION OF DRAWING

FIG. 16 is a diagram illustrating an exemplary similarity matrix indicating the similarity between the equipment state and the health state in an embodiment of the present invention.

FIG. 19 is a diagram illustrating exemplary feature transformation methods used in the feature transformation unit in the first embodiment of the present invention.

DESCRIPTION OF EMBODIMENTS

The present invention provides a method and the like for diagnosing the remaining useful life (RUL) of mechanical equipment by identifying the performance/quality level, which is an index indicating the health state of the mechanical equipment, in order to maintain and improve the operating rate of mechanical equipment used in factories, commercial facilities, construction sites, or the like. In order to achieve this, the remaining useful life of mechanical equipment is evaluated using sensor data, operation information, event information, facility loads, information on work reports, and the like by estimating the progress of fault level of the mechanical equipment to classify the performance level of the mechanical equipment. That is, sensor data and event information, as well as time-series data, such as operation information and facility loads, are used. Information on work reports about past failure cases is also used.

Specifically, the present invention provides methods for predicting the fault level, the performance/quality, and the RUL of mechanical equipment with high accuracy, wherein the methods include:

(1) prediction of a fault measure of mechanical equipment using the Gaussian process, a nonlinear regression procedure, and classification of the equipment state;

(2) prediction of a fault measure of mechanical equipment by applying a recognition procedure, such as the k-nearest neighbor (k-NN) method and the local subspace method, to time-series data, and classification of the equipment state; and (3) establishment of the relationship between the state of mechanical equipment and the health state indicating the performance/quality level, or the like, and prediction of the RUL based on this relationship.

Hereinafter, embodiments of the present invention will be described with reference to the drawings as necessary.

First Embodiment

Figure 1:
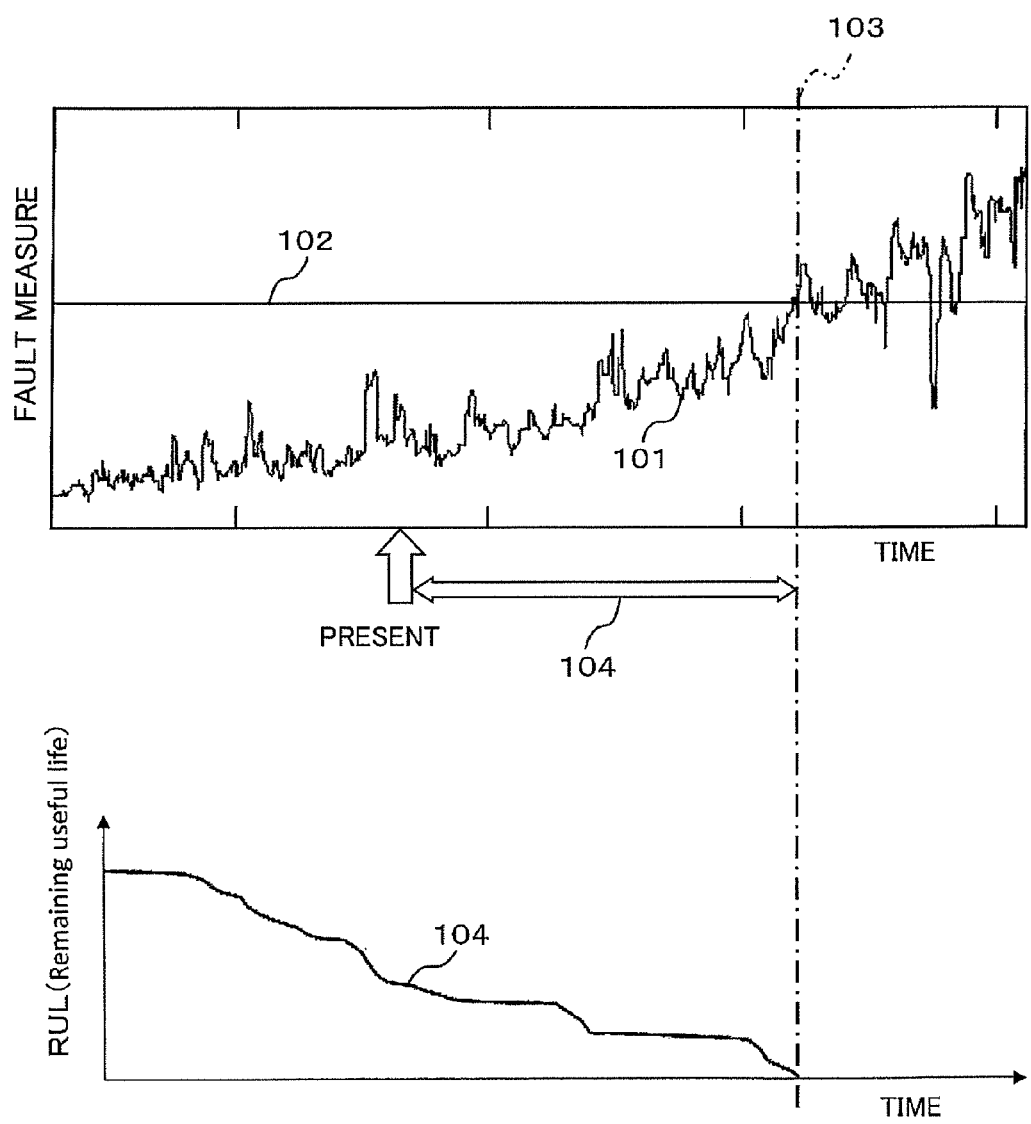
FIG. 1 is a figure describing the relationship between the RUL and changes in fault measure in a conventional manner.

FIG. 1 illustrates time-series data (upper) on fault measure 101 and time-series data (lower) on RUL 104, which are obtained from sensor data on mechanical equipment targeted for health management and/or fault diagnosis in the present invention.

Methods for calculating fault measure 101 and RUL 104 will be described below.

As illustrated in FIG. 1, fault measure 101 gradually increases with time. Threshold 102 indicated in FIG. 1, which is set for fault measure 101, indicates the limit at which mechanical equipment breaks down. That is, fault measure 101 over threshold 102 is determined that the state of the mechanical equipment is abnormal (faulty). It is noted that this determination is made regardless of actual fault (failure) occurrence according to the definition of the RUL described below.

Fault measure 101 indicated in FIG. 1 is an index indicating the fault level, but instead can be also considered as an index indicating the deterioration degree of performance or quality of the mechanical equipment. For example, the deteriorated performance refers to decreased fuel efficiency of gas engines or deteriorated precision of workpieces for pressing machines, and corresponds to quantitative and qualitative variables relevant to the output forms of others than the functions of the mechanical equipment, the quality of products produced with the mechanical equipment, or the like.

The remaining time until limit timing 103 of failure occurrence or performance deterioration over threshold 102 is referred to as RUL 104. The "RUL" here is the acronym for Remaining Useful Life. As indicated in FIG. 1, RUL 104 decreases with increasing fault measure 101, and RUL 104 reaches "0" when fault measure 101 exceeds threshold 102.

Figure 2:
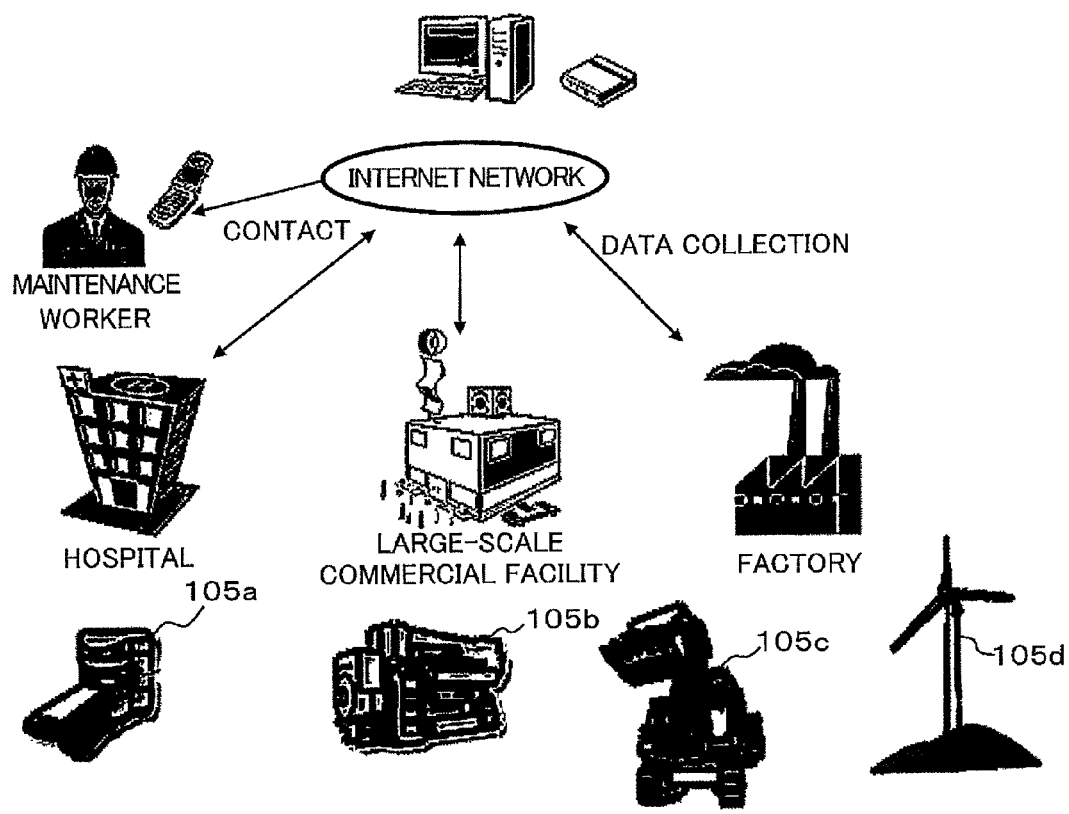
FIG. 2 is a diagram illustrating exemplary mechanical equipment targeted for health management by remote monitoring in the present invention.

FIG. 2 illustrates exemplary mechanical equipment targeted for health management or fault diagnosis by remote monitoring in the present invention. As illustrated in FIG. 2, mechanical equipment to be monitored includes medical diagnostic equipment 105a, such as nuclear magnetic resonance imaging (MRI) and X-ray computed tomography (X-ray CT) which are placed in hospitals; electric generator 105b, such as gas engines and gas turbines which are placed in factories, large-scale commercial facilities, and the like; construction machine 105c, such as power shovels and dump trucks which work in mines, construction sites, and the like; power station 105d, such as wind power generation and solar power generation which are placed in the outdoors. Thus, wide ranges of mechanical equipment are targeted for remote monitoring. Although not illustrated in the figure, railways, aircrafts, vessels, and the like are also targeted of remote monitoring. Processing equipment, such as pressing machines and twist-drill machines in factories, and assembly equipment composed of robots and the like are also targeted for remote monitoring. Hereinafter, medical diagnostic equipment 105a, electric generator 105b, and the like are collectively referred to as mechanical equipment 105 as appropriate.

This mechanical equipment 105 includes multiple sensors, which are configured to output various types of sensor data at respective points of mechanical equipment 105. A health management system or fault diagnosis system installed in a monitoring center collects and analyzes sensor data output from mechanical equipment 105 and environmental data on mechanical equipment 105 for 24 hours via an Internet network to monitor generation of fault signs in mechanical equipment 105, deterioration of the performance, or deterioration of the quality such as processing accuracy and assembling accuracy.

[Configuration of Health Management System]

Next, the configuration of the health management system according to a first embodiment of the present invention will be described with reference to FIG. 3.

Figure 3:
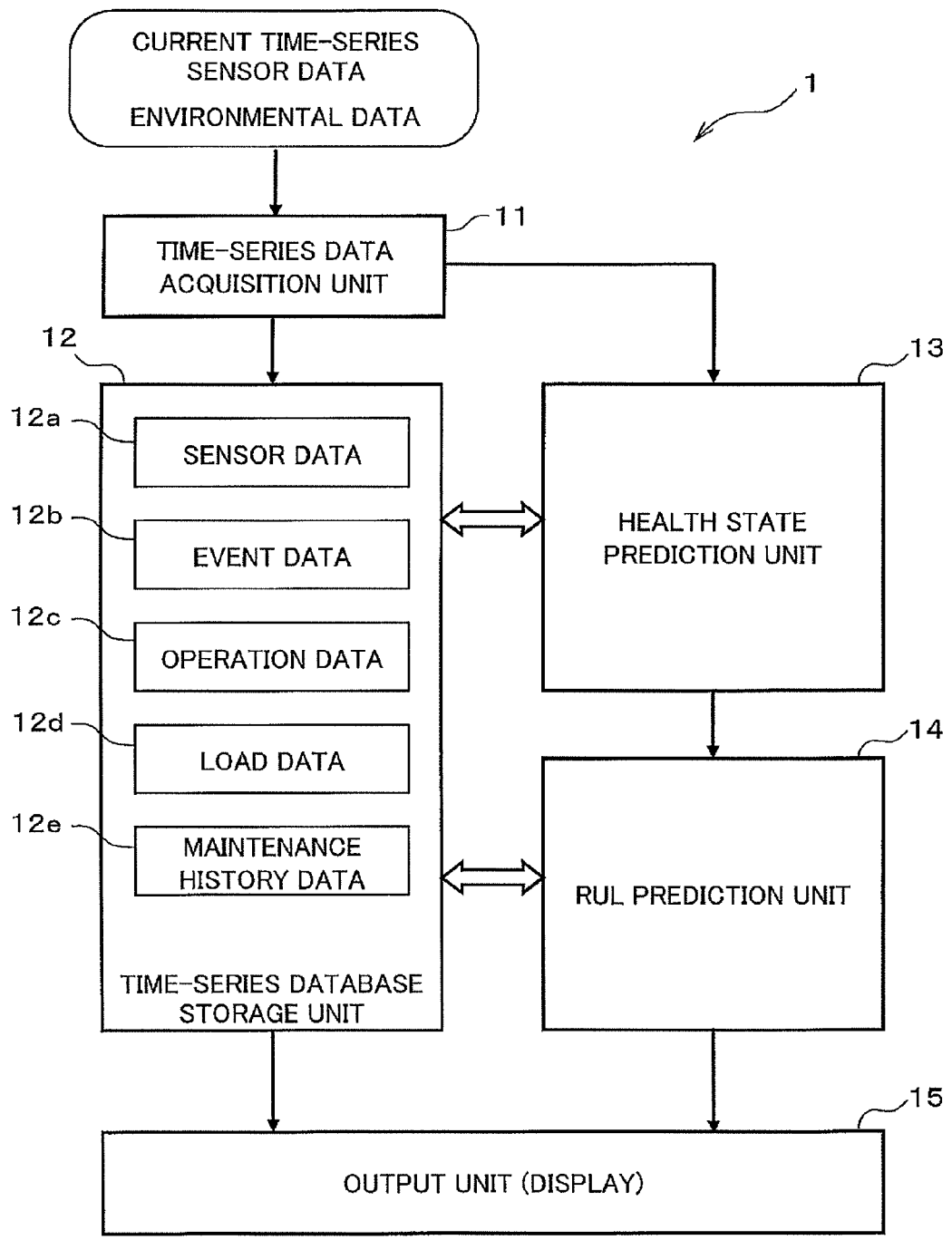
FIG. 3 is a block diagram illustrating the configuration of the health management system according to the first embodiment of the present invention.

As illustrated in FIG. 3, health management system (fault diagnosis system) 1 includes time-series data acquisition unit 11, time-series database storage unit 12, health state prediction unit 13, RUL prediction unit 14, and output unit 15.

Time-series data acquisition unit 11 is a unit configured to acquire multi-dimensional sensor data output from mechanical equipment 105 to be monitored (for example, medical diagnostic equipment 105a, electric generator 105b, and the like as illustrated in FIG. 1) and environmental data indicating an installation environment of mechanical equipment 105 via an Internet network or the like. The sensor data and environmental data are handled as time-series data associated with the acquisition time (or the output time from mechanical equipment 105). Time-series data acquisition unit 11 allows acquired latest or current time-series data to be sequentially stored in time-series database storage unit 12 upon its acquisition and thus accumulated therein, while outputting the current time-series data to health state prediction unit 13.

Time-series database storage unit 12 stores time-series database, which is the database of the time-series data received from time-series data acquisition unit 11. The time-series database stored in time-series database storage unit 12 is appropriately referred to by health state prediction unit 13 and RUL prediction unit 14 as past time-series data.

When newly acquired time-series data is added to time-series database storage unit 12, data is accumulated after an evaluation unit (not shown) evaluates the validity of the data (whether the data is newly added on the basis of the fact that there is no fault and the similarity to the data already stored in the time-series database), and the data is in the form of being used as past time-series data in the normal state.

When there are multiple targets to be monitored, time-series data is stored associated with mechanical equipment 105, a unit to be monitored.

The time-series database stored in time-series database storage unit 12 includes sensor data 12a, event data 12b as environmental data, operation data 12c, load data 12d, and maintenance history data 12e. These types of data are all associated with their acquisition time.

Event data 12b here indicates an operation state of mechanical equipment 105, for example, the control state of operating patterns, such as activation or termination of mechanical equipment 105.

Operation data 12c indicates operation time, such as driving time and manipulation time, of mechanical equipment 105 and the cumulative operation time. For example, for power shovels, operation data 12c corresponds to specific operation time, such as running time and turning operation time.

Load data 12d indicates a load state applied to mechanical equipment 105, and for example, corresponds to the status of load applied to engines, fuel efficiency, the number of patients in medical facilities, and the hardness of workpieces in machine tools.

Maintenance history data 12e indicates an operation history of past failure details, component replacement, or the like for mechanical equipment 105, and includes a list of work items carried out as maintenance works.

Health state prediction unit 13 estimates (predicts) the health state indicating the performance, quality, or the like using the current time-series data received from time-series data acquisition unit 11 and the past time-series data stored in time-series database storage unit 12. Health state prediction unit 13 outputs the performance or quality, which is an index of the estimated health state, to RUL prediction unit 14.

In order to estimate the health state, health state prediction unit 13 quantifies the state of mechanical equipment (equipment state) and the health state using the past time-series data to obtain the similarity between the equipment state distribution and the health state distribution. Health state prediction unit 13 then quantifies the equipment state upon acquisition of current time-series data and refers to the obtained similarity to estimate the health state.

The specific configuration of health state prediction unit 13 will be described below.

In this specification, the "fault" is defined as the fact that mechanical equipment is out of the state of stable operation, the "performance" as the performance including the functions of mechanical equipment, and the "quality" as something that has a direct effect on an end user. These terms are, however, usually defined by overlapped meanings. As a good example, the fuel efficiency of mobile bodies such as dump trucks is evaluated as the performance of mechanical equipment. For mechanical equipment that produces objects (products), the quality of the mechanical equipment can be evaluated by the quality level of products produced by the mechanical equipment.

The "equipment state" refers to the quantity of state to be quantified in any state of mechanical equipment whether it is normal or faulty, while the "health state" indicating the performance or quality basically refers to the quantity of state to be quantified in the normal state (equipment state) of mechanical equipment.

In the following description, unless otherwise specified, the "performance" or "quality", which is an index of the health state, is simply referred to as the "performance."

RUL prediction unit 14 receives the time-series data on the health state from health state prediction unit 13 and calculates the predicted value of the RUL using the received time-series data on the health state. RUL prediction unit 14 outputs the predicted result of the calculated RUL to output unit 15.

The specific configuration of RUL prediction unit 14 will be described below.

Output unit 15 receives the predicted result of the RUL from RUL prediction unit 14 while receiving the equipment state and health state, or sensor data 12a that has a large effect on the fault measure or performance measure from time-series database storage unit 12, and displays the waveforms of the received time-series sensor data 12a or time-series data indicating the health state or the like. Output unit 15 outputs these types of data to asset health management (AHM) and enterprise asset management (EAM), which are upper systems (not shown), instead of or in addition to display of these types of data.

Next, exemplary data will be described with reference to FIGS. 4 to 6.

Figure 4:
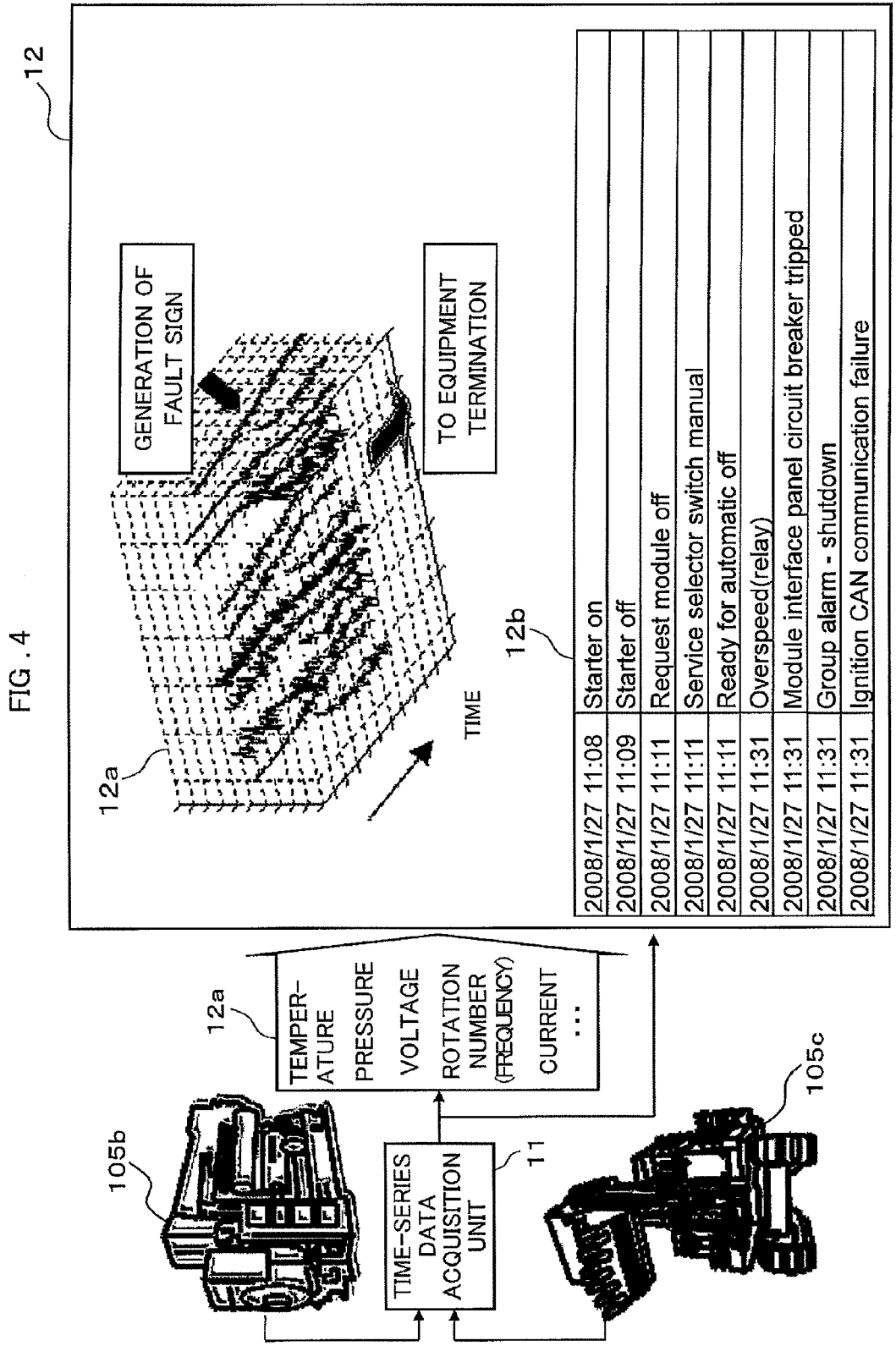
FIG. 4 is a diagram illustrating exemplary multi-dimensional time-series sensor data and event data which are used for health management in the present invention.
Figure 5:
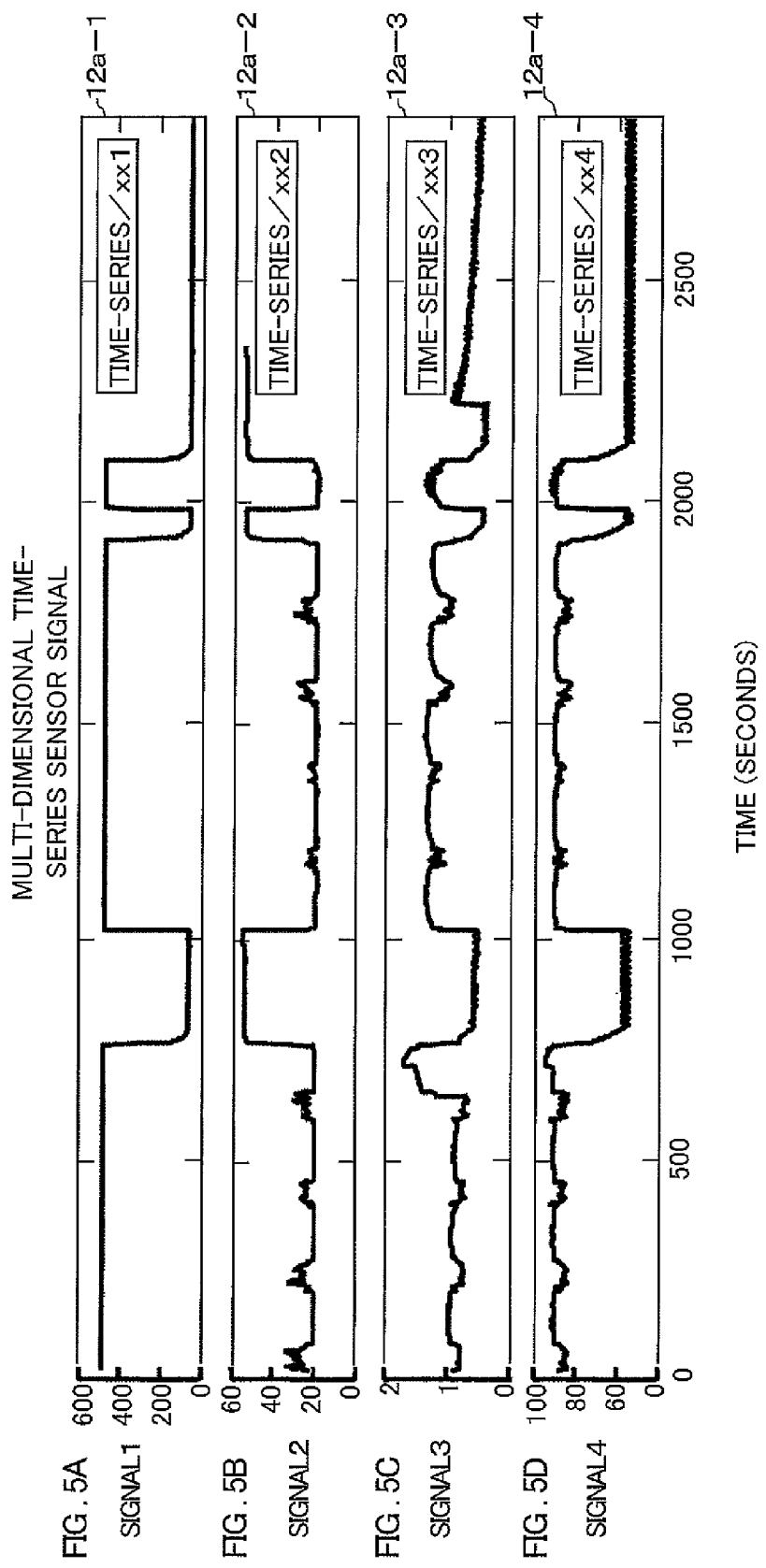
FIGS. 5A to 5D are diagrams illustrating exemplary multi-dimensional time-series sensor data which is used for health management in the present invention.

First, exemplary sensor data and event data are illustrated in FIG. 4. As illustrated in FIG. 4, multi-dimensional sensor data 12a and event data 12b which are output from electric generator 105b or construction machine 105c, which is mechanical equipment to be monitored, are acquired by time-series data acquisition unit 11. Although not illustrated in this figure, operation data 12c, load data 12d, and maintenance history data 12e, which are environmental data other than event data 12b, are also to be acquired.

Sensor data 12a includes the temperature of cooling water or oil, the pressure of oil, and voltage. Sensor data 12a may be composed of two or more types of data, or tens to tens of thousands of types of data. Sensor data 12a is acquired by time-series data acquisition unit 11 at predetermined sampling intervals.

Event data 12b is data indicating activation, termination, and other operations of mechanical equipment. Event data 12b may include alarm generated by a particular alarm device installed in the mechanical equipment.

FIGS. 5A to 5D illustrate exemplary sensor data 12a of gas engines. As illustrated in FIGS. 5A to 5D, sensor data 12a includes four-dimensional time-series sensor signals (data) composed of signals 1 to 4 (12a-1 to 12a-4) where operation is repeatedly turned ON and OFF.

Figure 6:
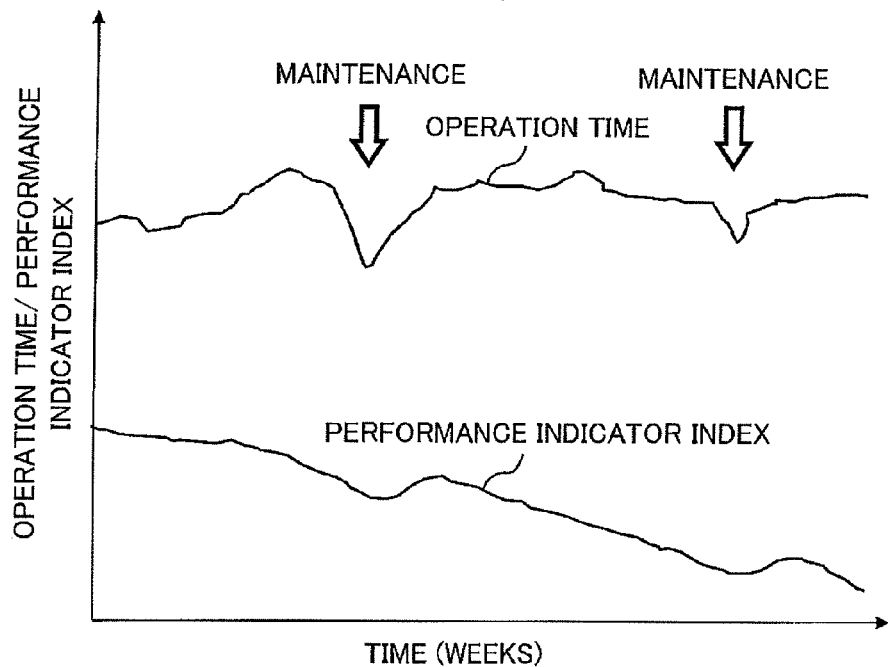
FIG. 6 is a figure illustrating both the operation time and the performance indicator index of mechanical equipment in parallel in the present invention.

FIG. 6 illustrates exemplary operation data 12c. The upper graph in FIG. 6 illustrates the operation time (weeks), which is operation data 12c. The lower graph in FIG. 6 illustrates the fuel efficiency, which is a type of load data 12d or performance data, or the performance indicator index corresponding to the fuel efficiency. The cumulative time-series operation time data here corresponds to the age of the mechanical equipment. In FIG. 6, the maintenance (maintenance work) is carried out at the time points indicated by the arrows. FIG. 6 shows how the performance indicator index is recovered just after the maintenance as a result.

[Method for Quantifying Equipment State or Health State]

Next, a method for quantifying the equipment state or health state will be described.

To quantify the equipment state or health state, the regression procedure, the recognition procedure, or the like can be used. Several procedures will be described below one by one.

It is noted that the equipment state or health state is quantified by health state prediction unit 13 illustrated in FIG. 3.

(First Quantification Procedure)

First, the regression procedure will be described as a first quantification procedure of the equipment state with reference to FIG. 7 (with reference to FIG. 3 as necessary).

The first quantification procedure involves producing a regression model with past time-series data as learning data and quantifying the equipment state or health state of current time-series data with the produced regression model.

The same applies whether the index to be quantified is any of the equipment state and the health state, and therefore the first quantification procedure will be described with the equipment state (may be referred to as the "state of mechanical equipment", or simply as the "state" in this specification) as an example.

Figure 7:
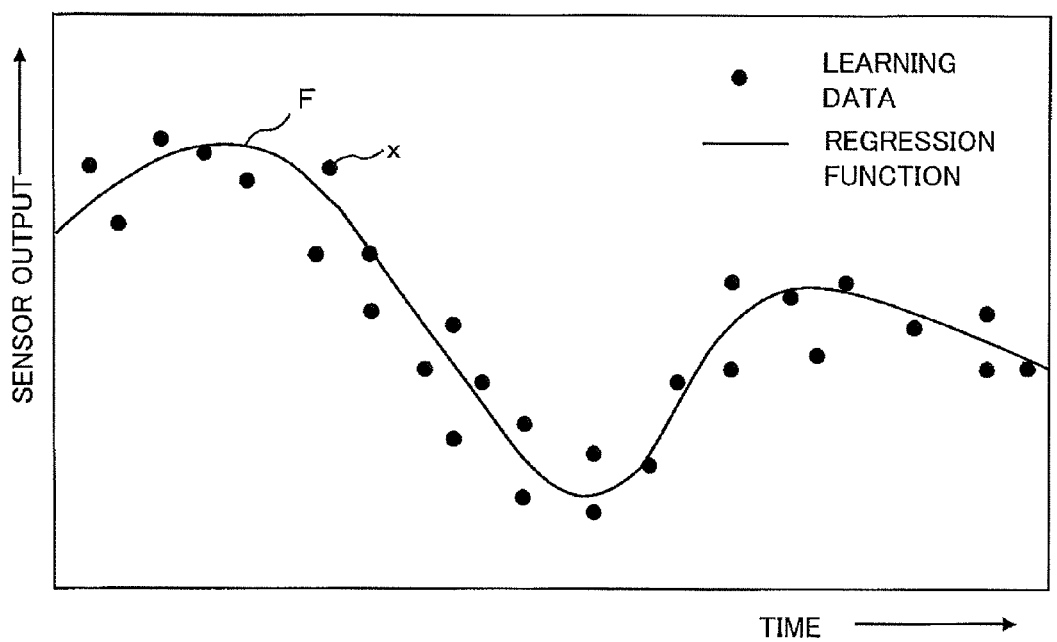
FIG. 7 is a figure describing the regression procedure as an example (first prediction procedure) which is used in the health state prediction unit in the first embodiment of the present invention.

FIG. 7 is a figure for describing a quantification method using the nonlinear regression procedure such as the Gaussian process. FIG. 7 describes learning data x and regression function F fitted to the learning data x. The learning data x indicated by black circles is past time-series sensor data selected as data similar to current time-series sensor data to produce a model.

Next, the case where the Gaussian process is used as a regression procedure will be described. There are many articles that describe the Gaussian process, but here the Gaussian process will be described on the basis of the procedure described in Non-Patent Literature 4. The features of the Gaussian process are that data similar to the learning data can be output as the predicted value (estimated value) of the equipment state for the current time-series sensor data (hereinafter the "current time-series data" is appropriately referred to as "observation data"), and the reliability of the prediction can be also output as a variance.

It is supposed that the equipment state corresponding to input vector $x_1, \ldots, x_n$ indicating the past time-series sensor data, which is learning data, is given as output $t=(t_1, \ldots, t_n)^T$. In this case, the prediction of output $t_{n+1}$ for new input vector $x_{n+1}$ input as current time-series sensor data is considered. The predicted value $t_{est}$ of this output $t_{n+1}$ can be obtained by equation (1.1).

[Equation 1]

$$p(t_{n+1} \mid t) \sim \qquad (1.1)$$
$$N(\underbrace{k^T\{K+\beta^{-1}I\}^{-1}t}_{\text{Output } t_{est}}, \underbrace{\{k(x_{n+1}, x_{n+1})+\beta^{-1}\} - k^T\{K+\beta^{-1}I\}^{-1}k}_{\text{Variance of output } t_{est}})$$

In equation (1.1), the function N (*, *) on the right side represents a normal distribution function, wherein the mean which is the value corresponding to the first variable is output $t_{est}$, which is the predicted value, and the variance which is the value corresponding to the second variable indicates the reliability of output $t_{est}$.

In equation (1.1), β is a hyperparameter indicating a noise fluctuation range, and vector k and matrix K are represented by equation (1.2) and equation (1.3), respectively.

[Equation 2]

$$k = (k(x_{n+1}, x_1), \ldots, k(x_{n+1}, x_n))^T \qquad (1.2)$$

$$K = \begin{pmatrix} k(x_1, x_1) & k(x_1, x_2) & \ldots & k(x_1, x_n) \\ k(x_2, x_1) & k(x_2, x_2) & \ldots & k(x_2, x_n) \\ \vdots & \vdots & \ddots & \vdots \\ k(x_n, x_1) & k(x_n, x_2) & \ldots & k(x_n, x_n) \end{pmatrix} \qquad (1.3)$$

In this equation, function k (*, *) represents a kernel function, and for example, the radial basis function (RBF) kernel represented by equation (1.4) can be used. In equation (1.4), σ is a distribution parameter.

[Equation 3]

$$k(x_i, x_j) = \exp\left(-\frac{\|x_i - x_j\|^2}{\sigma}\right) \qquad (1.4)$$

The Gaussian process weights past time-series sensor data (hereinafter the "past time-series data" is appropriately referred to as "past data") similar to the observation data in the calculation of the predicted value. In other words, in order to easily understand which past data is referred to (which past data is weighted), the equipment state belonging to the reference past data corresponds to the current equipment state from which the observation data is acquired. This corresponds to the starting point of a residual vector calculated by the local subspace method to be described below.

That is, when a multi-dimensional vector is considered which starts at the position of the reference past data and ends at the position of the observation data in the Gaussian process, the multi-dimensional vector can be defined as a multi-dimensional vector extending from the normal state to the fault state. This multi-dimensional vector corresponds to a residual vector in the local subspace method, as described above.

Accordingly, the equipment state can be quantified with the starting point position of the multi-dimensional vector. The length of the multi-dimensional vector can be used as a fault measure indicating the degree of deviation from the normal state.

Non-Patent Literature 5 described above has introduced a technique of estimating the RUL of lithium ion batteries using the Gaussian process. One of the technical differences between the embodiments of the present invention and the procedure described in Non-Patent Literature 5 is that the period until failure occurrence is defined as "RUL" in the procedure described in Non-Patent Literature 5. Another difference is that the RUL of lithium ion batteries is calculated on the basis of the assumption of a circuit physical model including resistance and capacitance. In the embodiments of the present invention, RUL 104 is defined as an operatable time with the health state (performance or quality) being maintained at a predetermined level. Supposing that the maintenance work can recover the deteriorated health state in the present invention, RUL 104 of short cycle is defined as the time until the next maintenance work is required, and this RUL 104 is predicted for each interval or for each maintenance work.

A wide range of mechanical equipment requires the cost for assuming and constructing a physical model and also requires accumulation of large volumes of sensor data and processing of the accumulated sensor data to ensure the accuracy, which is disadvantageous with increasing amount of costs. In consideration of this, the present invention can be carried out without always preparing an accurate physical model.

(Second Quantification Procedure)

Next, the k-nearest neighbor (k-NN) method, one of the recognition procedures, will be described as a second quantification procedure of the equipment state with reference to FIG. 8 (with reference to FIG. 3 as necessary).

In the second quantification procedure, past data including multi-dimensional sensor data and environmental data is also used as learning data in order to quantify the equipment state.

Figure 8:
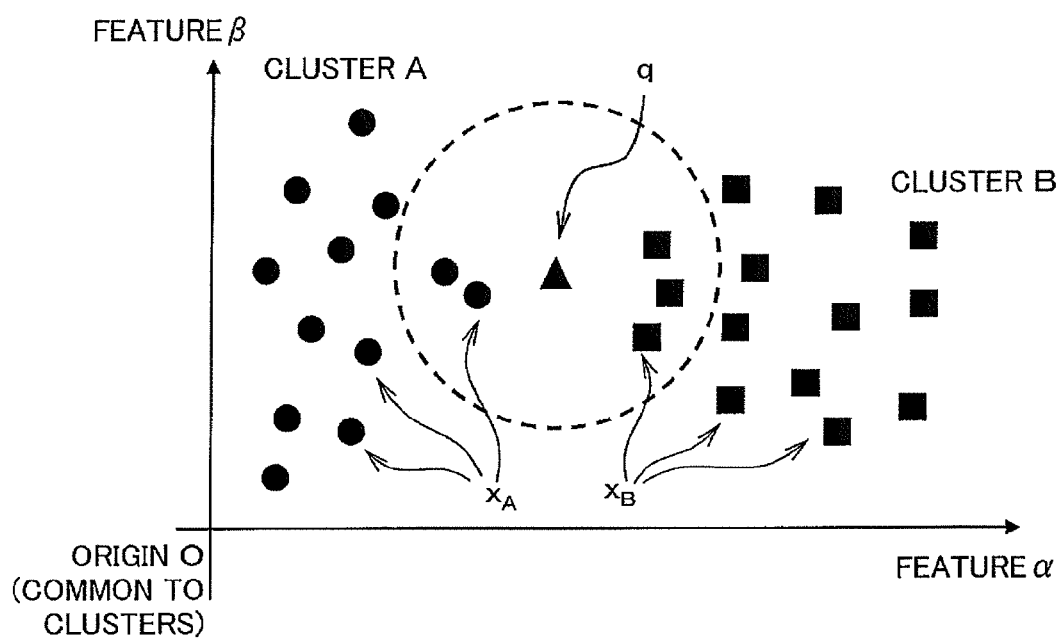
FIG. 8 is a figure describing the k-NN method as an example (second prediction procedure) which is used in the health state prediction unit in the first embodiment of the present invention.

FIG. 8 illustrates how k pieces of learning data near observation data q are selected by the k-NN method. FIG. 8 illustrates the case where two clusters A and B are present near observation data q (indicated by black triangles). In FIG. 8, learning data $x_A$, members of cluster A, is indicated by black circles; learning data $x_B$, members of cluster B, is indicated by black squares.

According to the k-NN method, k pieces of learning data nearest observation data q are selected first. As illustrated in FIG. 8, given that k=5, five pieces of learning data $x_A$ and $x_B$ in the circle illustrated with a broken line are selected. With regard to the selected five pieces of learning data $x_A$ and $x_B$, the cluster to which observation data q belongs is selected depending on the majority of selected members. In this example, there are more pieces of learning data $x_B$ (three pieces) belonging to cluster B than learning data $x_A$ (two pieces) belonging to cluster A, and thus observation data q is classified into cluster B.

The number of k can be appropriately set.

When a multi-dimensional vector is considered which starts at the centroid (representative value) of cluster B into which observation data q is classified and ends at the position of observation data q, the multi-dimensional vector can be defined as a multi-dimensional vector extending from the normal state to the fault state. This multi-dimensional vector corresponds to a residual vector in the local subspace method.

Accordingly, the equipment state can be quantified with the starting point position of the multi-dimensional vector. The length of the multi-dimensional vector can be used as a fault measure indicating the degree of deviation from the normal state.

In the k-NN method, selected learning data x ($x_A$, $x_B$) may be used for calculating the centroid of the selected learning data, instead of being used for selecting the cluster to which observation data q belongs. Then, the calculated centroid can be used as an indicator of the equipment state.

For example, learning data $x_A$ and $x_B$ as illustrated in FIG. 8 are supposed to belong to one cluster instead of two clusters A and B. A multi-dimensional vector which starts at the centroid of the selected learning data (five pieces of learning data x ($x_A$, $x_B$) in the case of FIG. 8) and ends at the position of observation data q can be then defined and used as a multi-dimensional vector extending from the normal state to the fault state.

In regard to application of the k-NN method to time-series data, multiple pieces of past time-series data for a predetermined period may be vectorized and handled as a piece of vector data, which is then may be targeted for the prediction of temporal locus.

That is, the vector data obtained by vectorizing multiple pieces of time-series data acquired for a predetermined period until the present time is used as observation data q. Similarly, the vector data of the above past time-series data acquired for each predetermined period is used as learning data x. Then, the distance between learning data x and observation data q is obtained, and multiple vectors (k vectors) of learning data near observation data q are selected according to the length of this distance.

(Third Quantification Procedure)

Figure 9:
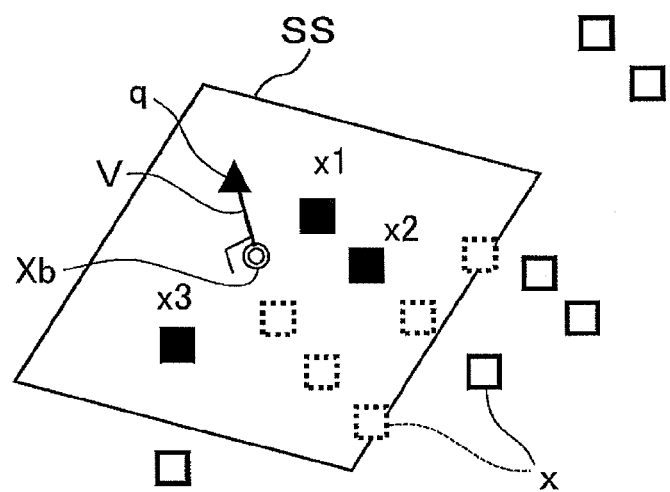
FIG. 9 is a figure describing the local subspace method as an example (third prediction procedure) which is used in the health state prediction unit in an embodiment of the present invention.

Next, the local subspace classifier (LSC) method, one of the recognition procedures, will be described as a third quantification procedure of the equipment state with reference to FIG. 9 (with reference to FIG. 3 as necessary).

This procedure is also explained, for example, in Patent Literature 1 as described above.

The LSC method involves generating a compact model including normal data by focusing on the similarity between time-series data sets. The LSC method will be described with reference to FIG. 9.

In this quantification procedure, pieces $x_1$ to $x_3$ of k-neighbor data of observation data q (unknown data) are first selected from learning data x in the same procedure as in the k-NN method described above using observation data q. Next, a (k−1)-dimensional local subspace (linear manifold) SS which is spread by k-neighbor data is produced. It should be noted that k can be any number equal to or less than the dimension of observation data q and learning data x. Then, residual vector V which starts at foot Xb of the perpendicular extending from observation data q to local subspace SS and ends at observation data q is obtained. The example illustrated in FIG. 9 is the case where k=3 and local subspace SS is (k−1)=2-dimensional space (plane).

A residual vector obtained by the LSC method can be used as a multi-dimensional vector extending from the normal state to the fault state. That is, the starting point of the residual vector indicates the equipment state, while the length of the residual vector indicates the degree of deviation from the normal state and can be used as a fault measure.

The way to obtain starting point Xb of residual vector V will be mathematically described.

In order to obtain starting point Xb, coefficient vector b of linear combination of learning data $x_i$ is calculated from observation data q and k pieces of learning data $x_i$ (i=1, 2, . . . , k) selected as the k-neighbor data. In order to do this, correlation matrix C is obtained by equation (2.1) using matrix Q including k pieces of observation data q and matrix X including k pieces of learning data $x_i$. Coefficient vector b is obtained by equation (2.2) using this correlation matrix C.

[Equation 4]

$$C = (Q - X)^T (Q - X) \quad (2.1)$$

$$b = \frac{C^{-1} 1_k}{1_k^T C^{-1} 1_k} \quad (2.2)$$

In this equation, $1_k$ represents a k-dimensional vector where all elements are 1. This equation (2.2) means that the coefficient vector of linear combination of $x_i$ (i=1, 2, ..., k) when the square error with observation data q is the minimum is set to b.

The L2 norm of residual vector V (=q−Xb) can be used as a fault measure.

Next, the procedure to obtain a residual vector by the LSC method will be described in more detail with reference to FIGS. 10 and 11.

Figure 10:
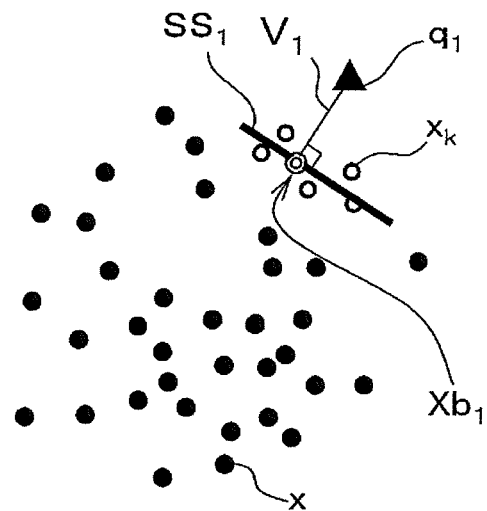
FIG. 10 is a diagram describing the modeling of the equipment state by the local subspace method.

First, as illustrated in FIG. 10, k pieces of learning data $x_k$ (indicated by white circles in FIG. 10) near observation data $q_1$ are selected. In this case, k=5. Then, local subspace $SS_1$ having a dimension decreased by one dimension is produced by k pieces of learning data $x_k$. This local subspace $SS_1$ is a 4-dimensional space although being indicated by a straight line for convenience in FIG. 10. Next, the perpendicular extending from observation data $q_1$ to local subspace $SS_1$ is obtained as residual vector $V_1$. The foot of the perpendicular is starting point $Xb_1$ of the residual vector. The point to which residual vector $V_1$ extends is observation data $q_1$.

Figure 11:
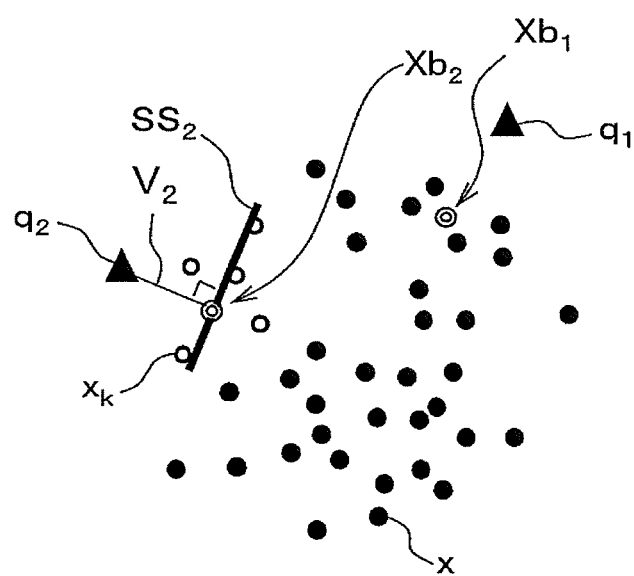
FIG. 11 is a diagram describing the modeling of the equipment state by the local subspace method.

FIG. 11 illustrates the case of different observation data $q_2$. In the same manner as observation data $q_1$, pieces of k-neighbor learning data $x_k$ of observation data $q_2$ are selected to produce local subspace $SS_2$ to obtain starting point $Xb_2$ of residual vector $V_2$.

Starting points $Xb_1$ and $Xb_2$ of the residual vectors here each represent the state in which mechanical equipment is placed (equipment state). When starting points $Xb_1$ and $Xb_2$ of the residual vectors are close, the equipment states can be also determined as similar to each other. Accordingly, the classification of starting points $Xb_1$ and $Xb_2$ of the residual vectors allows the equipment states to be categorized.

Figure 12:
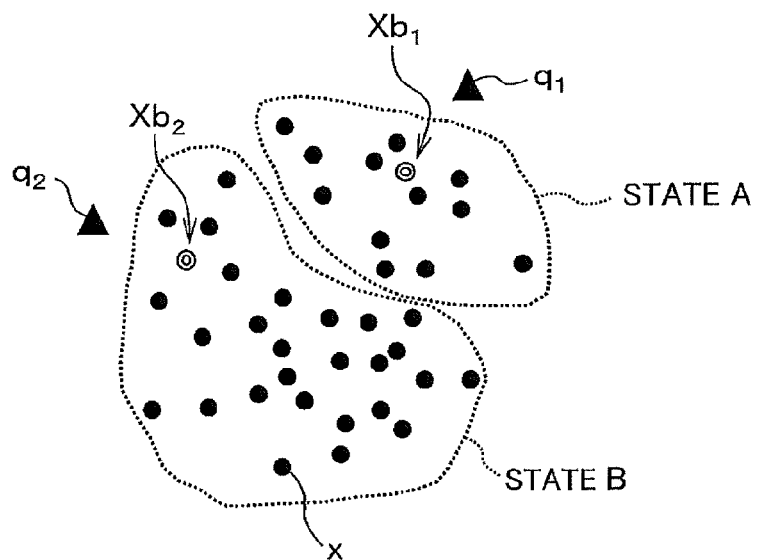
FIG. 12 is a diagram describing the modeling of the equipment state by the local subspace method.

FIG. 12 illustrates states A and B of categorized equipment states. FIG. 12 illustrates the case where the equipment states include two types of states A and B. Whether the equipment state is state A or B, the equipment state may vary inside each state. Categorization can be achieved by unsupervised clustering such as the k-average method.

The dimension of learning data x may be further increased by using environmental data, such as event data 12b, operation data 12c, and load data 12d (see FIG. 3), to classify learning data x.

This allows the equipment states to be classified in more detail. That is, starting point Xb of the residual vector for observation data q is obtained to specifically predict the equipment states.

Figure 13:
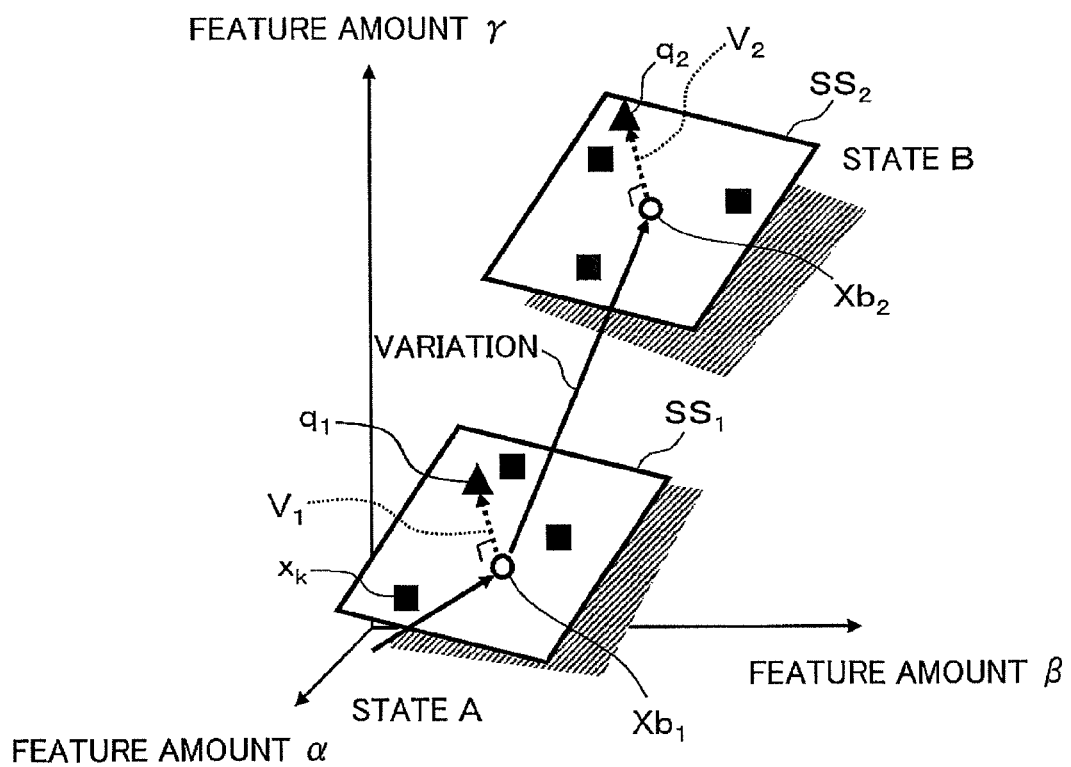
FIG. 13 is a diagram describing how the equipment state varies as predicted by the local subspace method.

FIG. 13 summarizes the above description about the prediction of the equipment state by the LSC method.

In FIG. 13, starting point $Xb_1$ of residual vector $V_1$ corresponding to observation data $q_1$ indicates that mechanical equipment is in state A. Starting point $Xb_2$ of residual vector $V_2$ corresponding to observation data $q_2$ indicates that mechanical equipment is in state B. According to this quantification procedure, it is found that the equipment state can be identified on the basis of which state (for example, state A or B, or the like) starting point $Xb_1$ or $Xb_2$ or the like of the residual vector corresponding to observation data $q_1$ or $q_2$ or the like is closer to, and thus the variation of the equipment state can be monitored.

The equipment state can be also monitored similarly even using the starting point of a multi-dimensional vector defined by other quantification procedures as described above, instead of the starting point of the residual vector by the LSC method.

That is, the equipment state can be monitored using other representative values including centroids of clusters to which data belongs and centroids of k pieces of learning data as obtained by the k-NN method, representative values of lists corresponding to codebooks of vector quantization, centroids in the k-average method, a type of non-hierarchical clustering, and further centroids of hierarchical clustering, such as the nearest neighbor method and the furthest neighbor method, the group average method, and the Ward method. The multi-dimensional vector extending from the normal state to the fault state can be defined by any procedure.

(Extension to Health State)

The procedure for monitoring the equipment state with the starting point of the multi-dimensional vector extending from the normal state to the fault state in the above quantification procedures, including the residual vector by the LSC method, can be applied to the health state such as the performance or quality of equipment.

Figure 14:
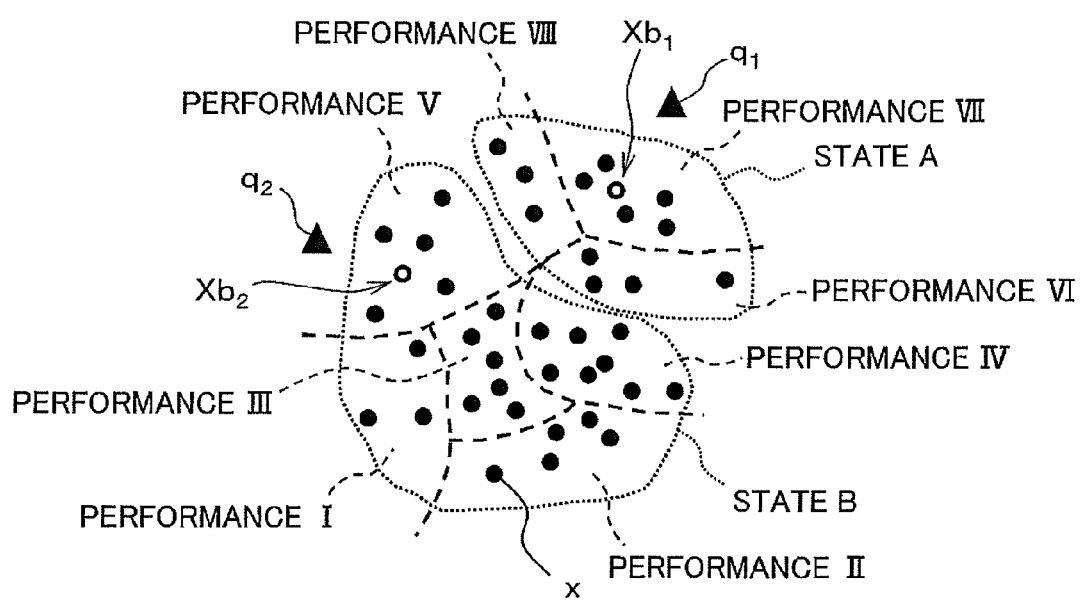
FIG. 14 is a diagram illustrating the relationship between the equipment state and the health state.

A procedure for quantifying the health state will be described with reference to FIG. 14. FIG. 14 illustrates how learning data x is classified by using, for example, the fuel efficiency, one of the performances, as an index of the health state. The performance level is classified into eight levels (performances I to VIII) in FIG. 14. The results vary depending on how the performance is evaluated and how these levels can be taught from the outside. The performance monitoring may be an issue of classification using learning data x, which is past time-series data.

Assuming that this classification is multi-class classification to classify into eight levels, i.e., eight categories, the accuracy of monitoring of the performance or the like can be evaluated in advance by cross-validation or the like, and thus the validity of learning data x can be also determined. The cross-validation here involves dividing learning data x into eight in this example, determining the parameter of classification using one of eight portions of the data, and evaluating the classification with the remaining seven portions of the data using the parameter to verify and confirm the validity of the classification.

[Method for Estimating Health State]

Next, a method for estimating the health state of mechanical equipment using the starting point of a residual vector indicating the equipment state corresponding to observation data will be described.

As described above, the equipment state can be quantified with the starting point of a residual vector corresponding to observation data by using past data including normal data. In the description of this estimation method, the case using the residual vector in the LSC method is described, but the vector is not limited to this and multi-dimensional vectors from the normal state to fault state by other procedures can be also used.

A fault or fault sign of mechanical equipment can be determined on the basis of the magnitude of a fault measure, which is defined as, for example, the length of the residual vector.

On the other hand, the health state can be estimated by clustering learning data in which the performance or quality indicating the health state or the like is taught from the outside to classify the health state, and determining which cluster in the health state classification, the starting point of the residual vector corresponding to the observation data belongs to.

There are various types of performances or qualities indicating the health state. For this, selecting data that has a large effect on each performance or quality to be estimated from multi-dimensional time-series data before use is effective for reducing a processing load for estimation and also for improving estimation accuracy. However, calculating various residual vectors according to various types of performances or qualities increases a processing load for estimation.

In this embodiment, the equipment states are clustered in advance and the health states are also clustered using the past data. The similarity between the clusters indicating the equipment state and the clusters indicating the health state is obtained wherein these clusters are generated by such clustering. When the observation data is acquired, the equipment state is estimated by calculating the starting point of the residual vector indicating the equipment state corresponding to the observation data, and the health state is further estimated using the similarity data between the equipment state and the health state.

Figure 15:
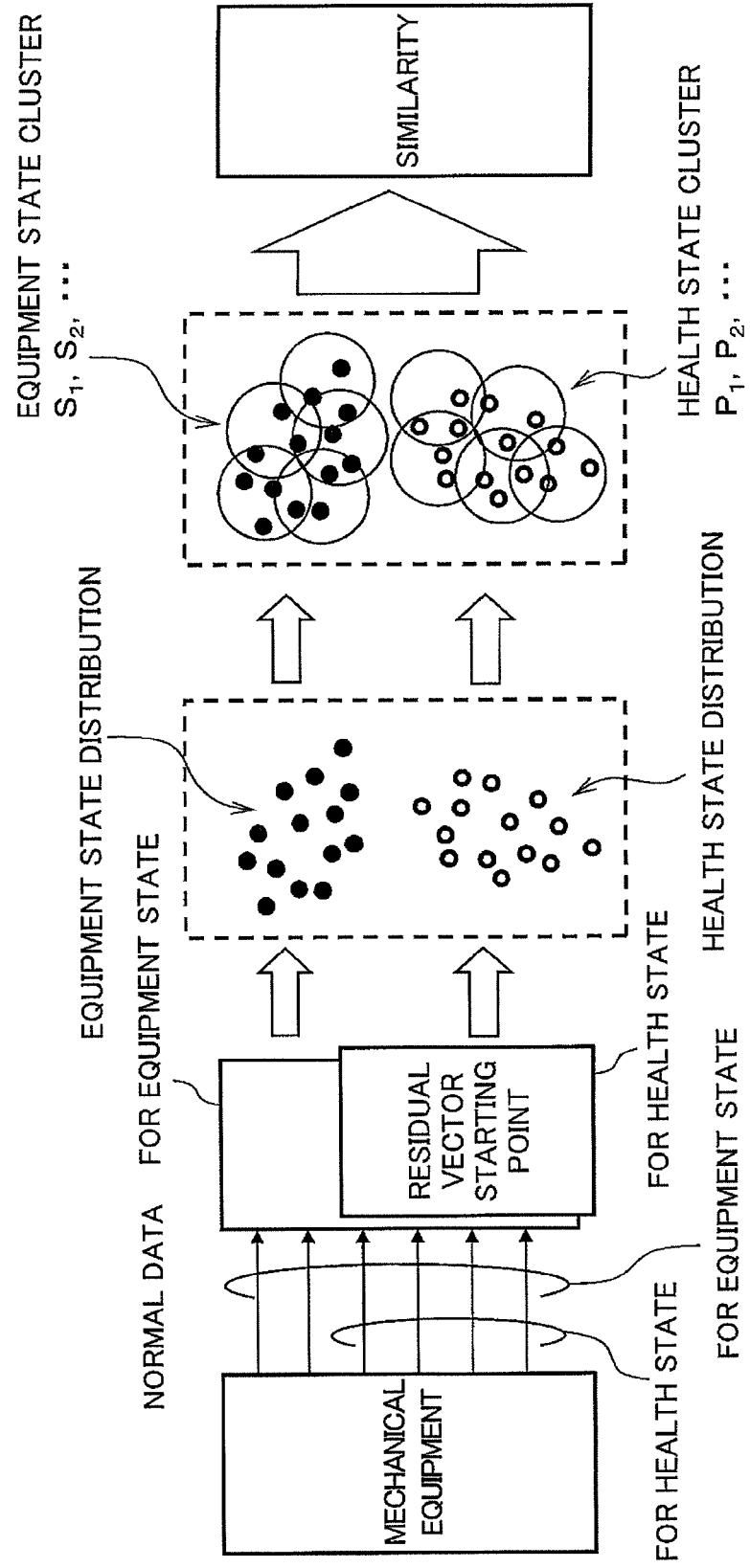
FIG. 15 is a conceptual figure describing a method for correlating the equipment state with the health state.

A method for obtaining the relationship between the equipment state and the health state (performance or quality) will be described with reference to FIG. 15.

In this embodiment, normal data acquired from mechanical equipment is used for learning data.

First, the starting points of residual vectors are obtained by the LSC method for substantially all sensor data, and the equipment state distribution formed by the starting points of the residual vectors is obtained. At the same time, the starting points of residual vectors are obtained by the LSC method for sensor data that affects the health state of the equipment, and the health state distribution formed by the starting points of the residual vectors is obtained.

Next, the equipment state distribution and the health state distribution are clustered with allowance for overlapping members. In the clustering of the health state distribution, the level of the health state (performance or quality level) is taught from the outside. This can generate equipment state clusters $S_1, S_2, \ldots$, and health state clusters $P_1, P_2, \ldots$.

Next, one cluster is selected from equipment state clusters $S_1, S_2, \ldots$ to calculate the similarity with respective health state clusters $P_1, P_2, \ldots$. The similarity is the similarity between the distributions and can be calculated by the mutual subspace method or the like. Selected equipment state clusters $S_1, S_2, \ldots$ are corresponded to health state clusters $P_1, P_2, \ldots$. The same applied to the remaining equipment state clusters. This can produce a similarity matrix indicating the relationship between equipment state clusters $S_1, S_2, \ldots$ and health state clusters $P_1, P_2, \ldots$, as illustrated in FIG. 16. The elements of the similarity matrix illustrated in FIG. 16 may be rearranged in accordance with the similarity level.

In this way, the relationship (degree of correlation etc.) between the equipment state and the health state can be obtained.

[Configurations of Health State Prediction Unit and RUL Prediction Unit]

Next, the specific configurations of health state prediction unit 13 and RUL prediction unit 14 in the first embodiment will be described with reference to FIG. 17 (with reference to FIG. 3 as necessary).

Health state prediction unit 13 includes similar time-series data selection unit 131, first discrimination unit 133a, second discrimination unit 133b, first starting point data storage unit 134a, second starting point data storage unit 134b, first cluster generation unit 135a, second cluster generation unit 135b, similarity calculation unit 136, similarity data storage unit 137, health state estimation unit 138, and health state storage unit 139.

Health management system 1 in this embodiment includes fault sign detection unit 16.

Similar time-series data selection unit 131 receives observation data, which is current time-series data, from time-series data acquisition unit 11, and selects data similar to the observation data from past data stored in time-series database storage unit 12. Specifically, similar time-series data selection unit 131 calculates the distance between an input vector which is the observation data and an input vector which is the past data accumulated in time-series database storage unit 12, and selects predetermined pieces of the past data from closer ones. More specifically, pieces of data having a value of the kernel function closer to "1" can be sequentially selected using the kernel function (for example, equation (1.4)) as described above.

Similar time-series data selection unit 131 outputs the selected past data to first discrimination unit 133a and second discrimination unit 133b.

First discrimination unit 133a and second discrimination unit 133b each receive the observation data and/or past data from similar time-series data selection unit 131, and quantify the equipment state and the health state, respectively. Specifically, these discrimination units calculate multi-dimensional vectors extending from the normal state to the fault state using the regression procedure, such as the Gaussian process, or the recognition procedure, such as the k-NN method and the LSC method, as described above and quantifies the equipment state and the health state on the basis of the starting point data of the multi-dimensional vectors.

First discrimination unit 133a allows the starting point data of the multi-dimensional vectors calculated for the past data to be stored in first starting point data storage unit 134a. First discrimination unit 133a outputs the starting point data of the multi-dimensional vectors calculated for the observation data to health state estimation unit 138 while outputting the length of the multi-dimensional vector as a fault measure to fault sign detection unit 16.

Second discrimination unit 133b allows the starting point data calculated for the past data to be stored in second starting point data storage unit 134b. Second discrimination unit 133b does not calculate multi-dimensional vectors for the observation data.

First starting point data storage unit 134a and second starting point data storage unit 134b store the starting point data of the multi-dimensional vectors received from first discrimination unit 133a and second discrimination unit 133b, respectively. The starting point data of the multi-dimensional vectors stored in first starting point data storage unit 134a and second starting point data storage unit 134b is read by first cluster generation unit 135a and second cluster generation unit 135b, respectively.

First cluster generation unit 135a and second cluster generation unit 135b cluster the starting point data of the multi-dimensional vectors stored in first starting point data storage unit 134a and second starting point data storage unit 134b respectively to classify the equipment state and the health state. In the clustering, second cluster generation unit 135b receives the level of the health state corresponding to the respective starting point data as training data from the outside.

First cluster generation unit 135a and second cluster generation unit 135b output cluster data generated by the clustering to similarity calculation unit 136.

Similarity calculation unit 136 receives the cluster data on the equipment state and the cluster data on the health state from first cluster generation unit 135a and second cluster generation unit 135b, and calculates the similarity indicating the relationship between the equipment state clusters and the health state clusters. Similarity calculation unit 136 allows the calculated similarity to be stored in similarity data storage unit 137 as a similarity matrix (see FIG. 16).

Similarity data storage unit 137 stores the similarity calculated by similarity calculation unit 136 as a similarity matrix. The similarity data stored in similarity data storage unit 137 is read by health state estimation unit 138.

Health state estimation unit 138 receives the starting point data indicating the equipment state for the observation data from first discrimination unit 133a, and estimates the health state with reference to the similarity matrix stored in similarity data storage unit 137. Health state estimation unit 138 allows the estimated health state to be stored in health state storage unit 139 as time-series data associated with the acquisition time of the observation data.

Health state storage unit 139 receives the estimated value of the health state from health state estimation unit 138 and stores the estimated value as time-series data associated with the acquisition time of the observation data. The estimated value of the health state stored in health state storage unit 139 is output as time-series data on the health state to RUL calculation unit 141, maintenance effect calculation unit 142, and output unit 15 in RUL prediction unit 14.

The specific configuration of first discrimination unit 133a and second discrimination unit 133b will be described here with reference to FIG. 18 (with reference to FIG. 17 as necessary).

Figure 18:
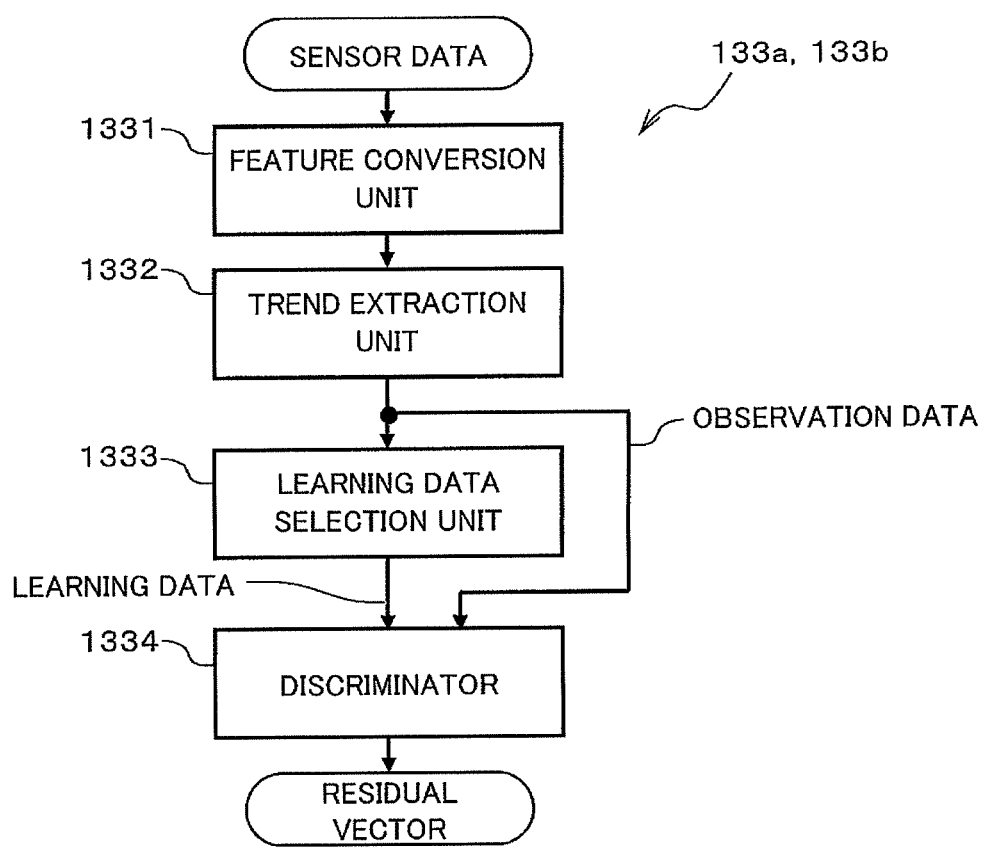
FIG. 18 is a block diagram illustrating the configuration of the discrimination units (first and second discrimination units) in the first embodiment of the present invention.

First discrimination unit 133a and second discrimination unit 133b have the same configuration and include, as illustrated in FIG. 18, feature transformation unit 1331, trend extraction unit 1332, learning data selection unit 1333, and discriminator 1334.

First discrimination unit 133a and second discrimination unit 133b (hereafter, these units are collectively referred to as discrimination unit 133 as appropriate) calculate multi-dimensional vectors corresponding to residual vectors by the LSC method or residual vectors by another procedure for the observation data or the past data, as described above.

Time-series data, such as sensor data 12a, event data 12b, operation data 12c, load data 12d, and maintenance history data 12e, is basic data of the equipment state distribution and health state distribution which are expressed as the distribution of the starting point data of the multi-dimensional vectors such as the residual vectors. When a power shovel is taken as an example, cooling water temperatures and the accumulated values thereof correspond to the states of the mechanical equipment. However, the accumulated cooling water temperatures may be related to deteriorated performance. However, different mechanical equipment may have a different configuration (different in component and assembly) and a different environment (operational environment, human-caused factor), and thus it is difficult to properly express the performance (health state) of such mechanical equipment. Instead of studying factors of deteriorated performance, external evaluation of the performance as a result is given as training and subjected to learning. Including the performance gross, the results of learning and the factors are also output.

Feature transformation unit 1331 performs feature transformation on the observation data and past data including multi-dimensional sensor data as pretreatment. Feature transformation unit 1331 outputs the feature-transformed observation data and past data to trend extraction unit 1332.

Exemplary procedures of the feature transformation are shown in FIG. 19. Typical procedures include principal component analysis (PCA), independent component analysis (ICA), and Wavelet transform.

Reducing the number of dimension of the time-series data to three or less through the principal component analysis enables visual display of the behavior of starting points of high-dimensional residual vectors. Observing the distribution of the starting points of residual vectors through the independent component analysis or wavelet transform may reveal changes in state more clearly.

Figure 20:
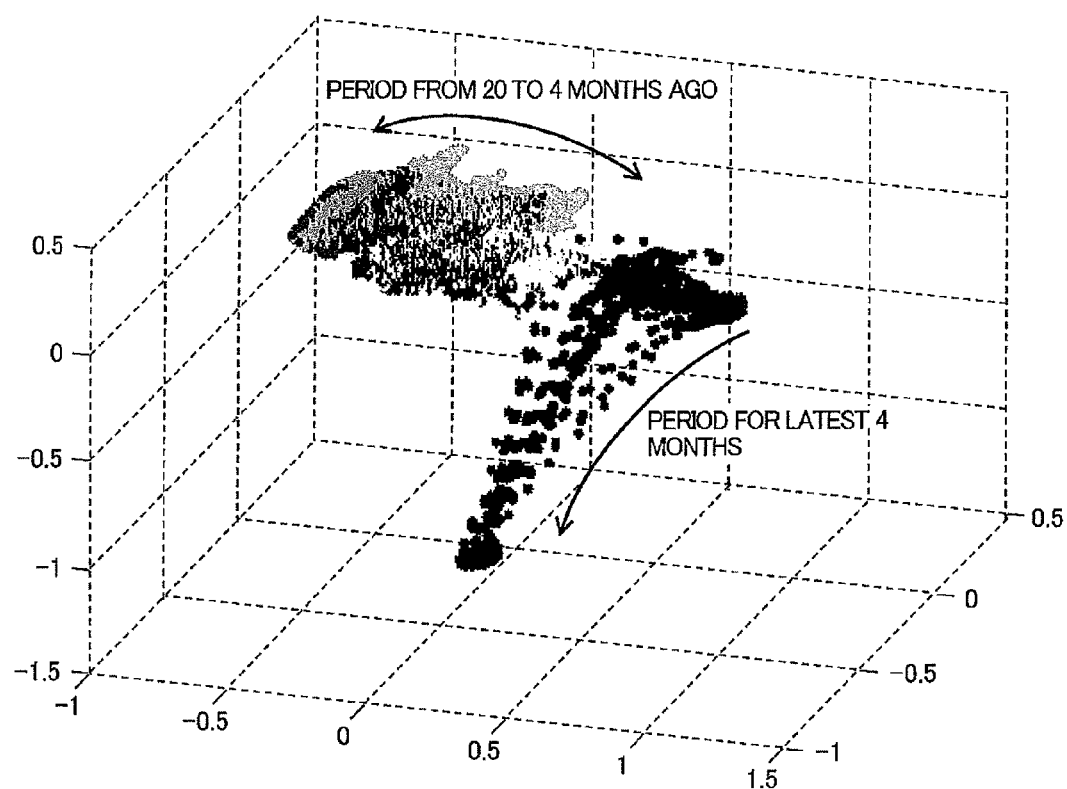
FIG. 20 is a figure illustrating the behavior of the starting points of residual vectors after the independent component analysis is performed on sensor signals.
Figure 21:
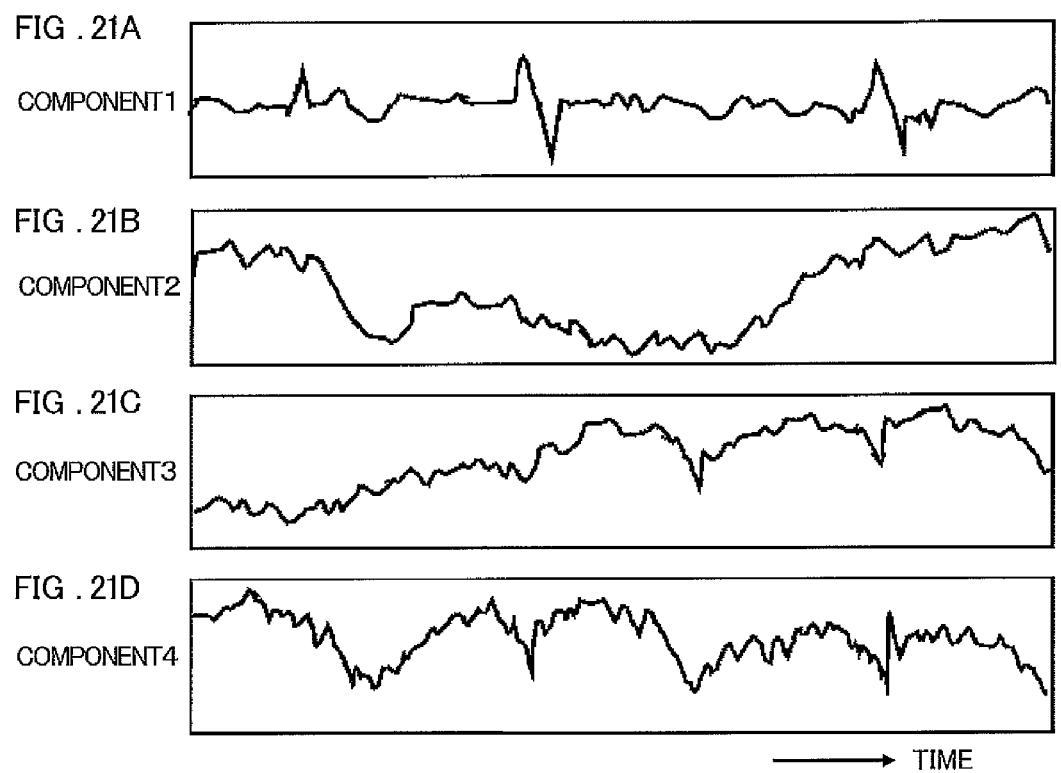
FIGS. 21A to 21D are figures illustrating four exemplary independent components having different frequency characteristics in the independent component analysis.

FIG. 20 illustrates the locus of the starting points of residual vectors calculated for the observation data after the independent component analysis. The independent component analysis can also reduce the dimension of the time-series data, as in the principal component analysis. The example illustrated in FIG. 20 is displayed by reducing the dimension to three. The number of dimension can be controlled by using the kurtosis of independent components or the like.

In FIG. 20, the plotted starting points are expressed with the shade being changed every four months. In FIG. 20, the data for latest four months, which is the data near the present, is represented by black plots. It is found that the starting points of the residual vectors vary largely in the latest four months as compared with the behavior the starting points of the residual vectors from twenty to four months ago represented by plots other than black. That is, state variation is found to occur in the latest four months.

Furthermore, in the independent component analysis of the sensor data, the weight is calculated from mixing coefficient matrix A obtained by the independent component analysis procedure, whereby the size of the signals of independent components can be also controlled.

Given that n-dimensional observation data is x(t) and m-dimensional independent components of unknown independent components are s(t), their relationship is expressed by equation (3.1) using mixing matrix A of n×m dimension. The relationship can be also expressed by equation (3.2) using inverse matrix W of mixing matrix A. In these equations, t represents time.

[Equation 5]

$$\begin{pmatrix} x_1(t) \\ \vdots \\ x_n(t) \end{pmatrix} = A \begin{pmatrix} s_1(t) \\ \vdots \\ s_m(t) \end{pmatrix} \qquad (3.1)$$

$$\begin{pmatrix} s_1(t) \\ \vdots \\ s_m(t) \end{pmatrix} = W \begin{pmatrix} x_1(t) \\ \vdots \\ x_n(t) \end{pmatrix} \qquad (3.2)$$

In the independent component analysis, observation data x(t) is used to obtain independent components s(t) and mixing matrix A. The contribution ratio of the j-th independent component to the sensor output can be calculated by equation (3.3). Furthermore, if the performance or state can be taught, the above weight can be also corrected using the learning data including the taught performance and state.

Useful knowledge, such as which independent component to be weighted, can be obtained by learning using the past data.

[Equation 6]

$$\text{Contribution ratio of } j\text{-th independent component} = \frac{\sum_{i=1}^{n} A_{ij}^2}{\sum_{j}^{m} \sum_{i}^{n} A_{ij}^2} \quad (3.3)$$

With reference back to FIG. 18, the configuration of discrimination unit 133 is still described.

Trend extraction unit 1332 receives the feature-transformed observation data and past data from feature transformation unit 1331, and further extracts a trend component from the feature-transformed observation data and past data, and adds the trend component as a component of vector data, which is observation data and past data for calculating a multi-dimensional vector in discriminator 1334. Trend extraction unit 1332 outputs the observation data including the trend component to discriminator 1334 and allows the past data including the trend component to be stored in learning data selection unit 1333.

Trend extraction unit 1332 is to make fault sign detection easier by extracting the trend component for the independent components obtained by the independent component analysis and using the tendency of the trend component. This trend component is also useful for monitoring the performance if the relationship between the trend component and the performance can be established.

For example, FIGS. 21A to 21D illustrate four independent components having a different frequency. In FIGS. 21A to 21D, the independent components designated as components 1 and 4 are observed to have an intrinsic frequency. The frequency analysis of these components and classification according to the frequency can separate the repeatability of mechanical equipment, the long-term trend, short-term sudden phenomena, irregular noise components, or the like. This analysis and classification reveal the relationship between these frequency characteristics and the frequency characteristics of installation environments of the mechanical equipment, for example, room temperature, outside air temperature, load variation, the cycle of maintenance work, or the like. This can explain various phenomena. The quantification of the trend may also lead to the prediction of the equipment state and the prediction of the health state. It can also determine whether the maintenance work is urged.

The independent component analysis is described in detail in, for example, reference 1.
(Reference 1) "Detailed Explanation, Independent Component Analysis—New World of Signal Analysis, Tokyo Denki University Press (2005/February)"

With reference back to FIG. 18, the configuration of discrimination unit 133 is still described.

Learning data selection unit 1333 receives the past data including the trend component from trend extraction unit 1332 and stores it as learning data, while selecting data similar to the observation data and outputting the selected data to discriminator 1334 for the discrimination process in discriminator 1334.

Discriminator 1334 receives the observation data from trend extraction unit 1332 while receiving the learning data from learning data selection unit 1333, and calculates a multi-dimensional vector extending from the normal state to the fault state, such as the residual vector corresponding to the observation data, by the regression procedure or recognition procedure as described above, or the like.

Discriminator 1334 outputs the starting point data of the multi-dimensional vector for the past data, as an output from first discrimination unit 133a or second discrimination unit 133b, to the corresponding first starting point data storage unit 134a or second starting point data storage unit 134b. Furthermore, when discriminator 1334 is first discrimination unit 133a, first discrimination unit 133a outputs the starting point data of the multi-dimensional vector for the observation data to health state estimation unit 138 while outputting the length of the multi-dimensional vector as a fault measure to fault sign detection unit 16.

RUL prediction unit 14 involves RUL calculation, calculation of the recovery effect of the maintenance work on the health state, and determination of the next maintenance work timing with reference to the time-series data on the health state stored in health state storage unit 139. In order to do these, RUL prediction unit 14 includes RUL calculation unit 141, maintenance effect calculation unit 142, and maintenance timing determination unit 143.

[Method for Predicting RUL]

Here, a method for predicting RUL is described.

The equipment state and health state depend not only on a defect of mechanical equipment but also on maintenance work. The maintenance work includes component replacement, adjustment, lubrication, and upgrade of software. It also includes regular maintenance, and check and adjustment at every operation time. When the way that the starting point of the residual vector (or the starting point of the multi-dimensional vector by the above other procedure) is displaced is evaluated in synchronization with the maintenance work, repeated cycles of deterioration from the normal state, slight recovery by maintenance, and subsequent deterioration can be observed.

Figure 22:
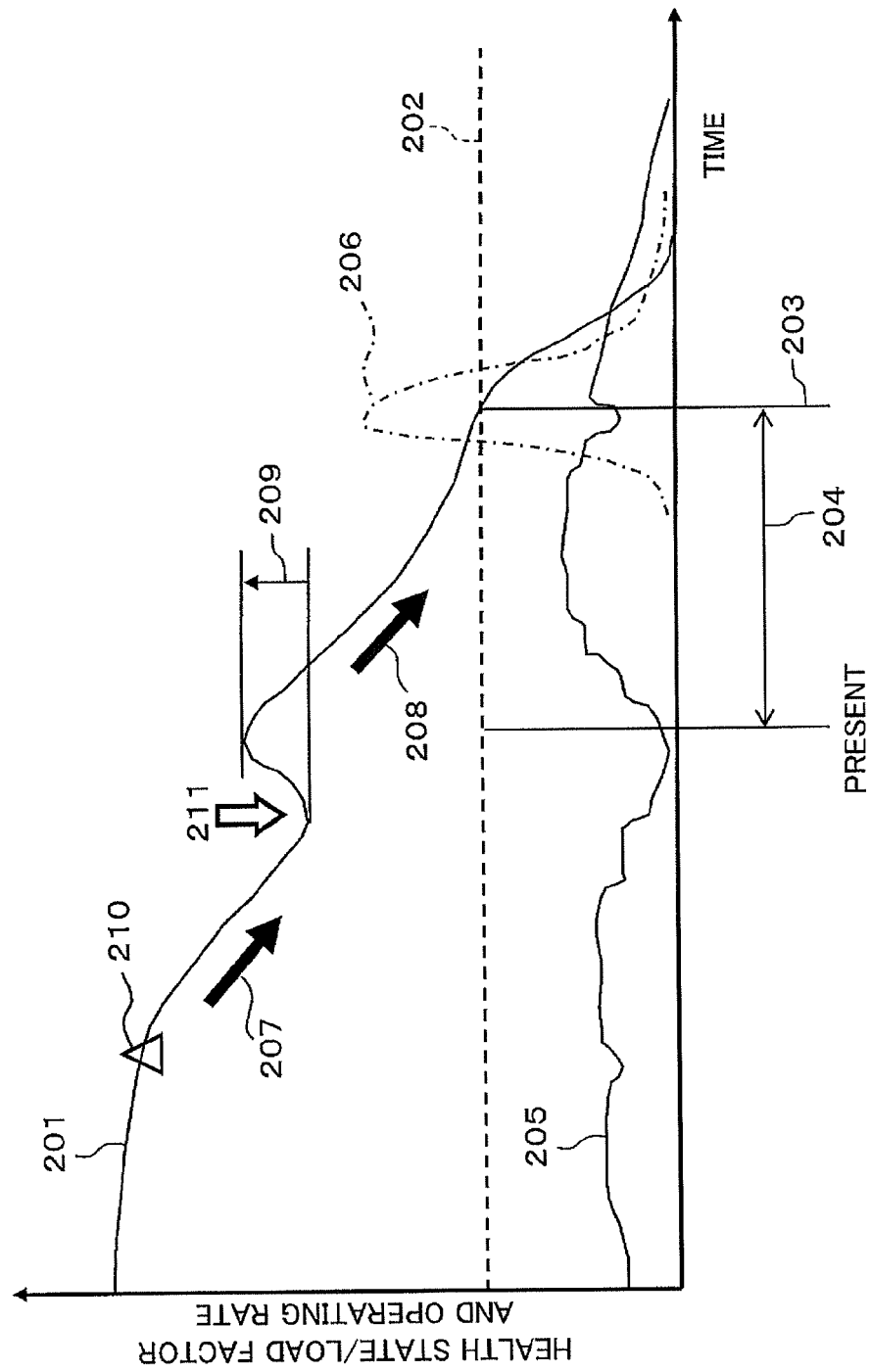
FIG. 22 is a figure describing predicted changes in health state of mechanical equipment and estimation of the RUL in the first embodiment of the present invention.

The remaining useful life (RUL) of the mechanical equipment until the next maintenance work will be described with reference to FIG. 22 (with reference to FIGS. 3 and 17 as appropriate). In FIG. 22, the health state and the load factor/operating rate of the mechanical equipment are taken along the vertical axis, and the time is taken along the horizontal axis. The health state indicates the performance or quality, as described above. In FIG. 22, the health state of the mechanical equipment decreases with time, as indicated by slope 207. The health state is slightly recovered by maintenance work 211 during the time course up to the present. The triangle represents generation of alarm 210 during the time course. Load factor/operating rate 205 of the mechanical equipment is shown in the lower side for reference. The health state becomes the minimum just before maintenance work 211, and the health state is increased to the maximum by maintenance work. The health state then gradually decreases along slope 208. The difference in health state between the minimum (valley) to the maximum (mountain) of the health state before and after this maintenance work is indicated by recovery effect 209 of the maintenance work on the health state.

In FIG. 22, slope 207 is the slope indicating the decreasing degree of the health state before the maintenance, and slope 208 is the slope indicating the decreasing degree of the health state after the maintenance. This illustration facilitates understanding of the relationship between the health state of the mechanical equipment and the maintenance work, the operation time, and the status of load applied to the mechanical equipment, or the like.

The remaining time until limit timing 203 at which the health state decreases to below predetermined threshold 202 and thus decreases to the limit of the health state (for example, performance limit) is indicated by RUL 204 of the mechanical equipment as determined from the viewpoint of health state.

From the graph illustrating the temporal variation of the health state, limit timing 203 at which the health state decreases to predetermined threshold 202 can be extrapolated by calculating slope 208 at the present time to predict RUL 204 as the trend component of changes in health state. To predict limit timing 203, the trend of changes in health state, including not only slope 208 (or first derivative) of the health state but also higher-order derivative such as the secondary derivative, can be also analyzed and used.

Limit timing 203 can be also calculated as probability distribution 206 by predicting limit timing 203 using a statistical model, such as the regression procedure.

The time from the present time to predicted limit timing 203 can be then calculated as the predicted value of RUL 204.

It is noted that the operation continuity is ensured until limit timing 203. Therefore, the maintenance can be scheduled on the basis of RUL 204 of this mechanical equipment. That is, the next maintenance work timing can be set within a period of predicted RUL 204 from the present time. Therefore, even when periodical maintenance work timing is set in advance and the time until predetermined timing is longer than RUL 204, the maintenance work timing can be set to earlier timing within RUL 204. When the time until predetermined timing is shorter than RUL 204, the maintenance work timing can be also set to later timing within RUL 204.

Lithium ion batteries or hard disk drives often have no maintenance work, and thus the health state does not increase and decrease in such manner but basically decreases in monotone. Therefore, the present invention is particularly useful for mechanical equipment with increasing and decreasing health state through the maintenance work.

The comparison of slope 208 indicating the decreasing degree of the health state after maintenance work 211 with slope 207 before maintenance work 211 can also provide understanding of what RUL 204 calculated before maintenance work 211 will be.

It is noted that RUL 204 is measured from the starting point at which the maximum recovery effect 209 on the health state after maintenance work 211 is obtained. Limit timing 203 of the following health state at which the maintenance work should be carried out can be determined from this graph.

Recovery effect 209 of the maintenance work on the health state cannot completely recover the health state to the original one every maintenance work, thereby expecting that the recovery of the health state gradually becomes difficult. Accordingly, by measuring the health state before and after each maintenance work and estimating recovery effect 209 to evaluate the non-recovery level, a deterioration tendency of the health state can be easily understood.

Therefore, in order to easily understand the tendency, it is important to quantify the position of the starting point of the residual vector indicating the equipment state, or the way that the starting point is displaced by adjustment or component replacement, for example, in the multi-dimensional space shown in FIG. 14, and display the health state or the date and time to indicate the starting point position.

Accordingly, the maintenance work data is input to evaluate the way that the starting point of the residual vector is displaced. The starting point of the residual vector moves every maintenance work 211, whereby the sequence of their points is obtained. Then, this sequence of the points repeats a cycle of deterioration from the normal state, slight recovery through maintenance work 211, and subsequent deterioration. When the movement per unit time is taken into consideration, the rate of changes in health state, i.e., slope (tendency) 208 indicating the decreasing degree of the health state after maintenance work 211 can be also determined.

Furthermore, the effectiveness of each item of the maintenance work can be also determined. The examination of the relationship between variations in the starting point of the residual vector and the items of the maintenance work reveals which item may shift the position of the starting point of the residual vector or the like. Conversely, for some items, the ineffectiveness of the items can be also determined from the movement of the starting point of the residual vector. Accordingly, the relationship between the items of such maintenance work and changes in the starting point of the residual vector is accumulated and used for selecting work items to be carried out in the next maintenance work to improve the efficiency of the maintenance work.

Alternatively, when the starting point of the residual vector indicating the equipment state or health state varies largely, sensor data that makes a large contribution to the variation of the starting point of the residual vector is extracted, and the extracted sensor data may be handled as sensor data to be noted for indicating the equipment state or health state. That is, when the position of the starting point of the residual vector indicating the mechanical equipment state or health state changes by a predetermined value or more, the sensor data that varies with changing starting point position of this residual vector is used as a performance indicator index and can be further displayed and/or output to the outside by output unit 15. Of course, sensor data that has the same behavior as an external index indicating the performance or the like can be also selected.

With reference back to FIG. 17, the configuration of each component of RUL prediction unit 14 is described.

RUL calculation unit 141 analyzes the trend of changes in health state (for example, slope 208 illustrated in FIG. 22) with reference to the time-series data on the health state stored in health state storage unit 139 to estimate the timing (limit timing 203 illustrated in FIG. 22) at which the health state decreases below a predetermined threshold (threshold 202 illustrated in FIG. 22), and calculates the time from the present to the estimated timing as RUL (RUL 204 illustrated in FIG. 22). RUL calculation unit 141 outputs the RUL calculated value as the predicted result of the RUL to output unit 15 and maintenance timing determination unit 143.

Maintenance effect calculation unit 142 analyzes the transition of the health state before and after the maintenance work with reference to the time-series data on the health state stored in health state storage unit 139, and calculates the recovery effect (recovery effect 209 indicated in FIG. 22) of the maintenance work on the health state. Maintenance effect calculation unit 142 outputs the calculated recovery effect on the health state to maintenance timing determination unit 143.

Maintenance timing determination unit 143 receives the predicted result of the RUL from RUL calculation unit 141 while receiving the recovery effect on the health state from maintenance effect calculation unit 142, and determines the next maintenance work timing. For example, the maintenance work timing can be determined within a time range of predicted RUL from the time of predicting the RUL.

Fault sign detection unit 16 receives a fault measure from first discrimination unit 133a, and detects the presence of a fault sign by determining that there is a fault sign when the fault measure exceeds a predetermined threshold and determining that there is no fault sign when the fault measure is the threshold or less. Fault sign detection unit 16 outputs the determined result of the fault sign to output unit 15.

[RUL Prediction Process]

Next, the RUL prediction process with health management system 1 according to an embodiment of the present invention will be described with reference to FIG. 23 (with reference to FIGS. 3 and 17 as necessary).

Figure 23:
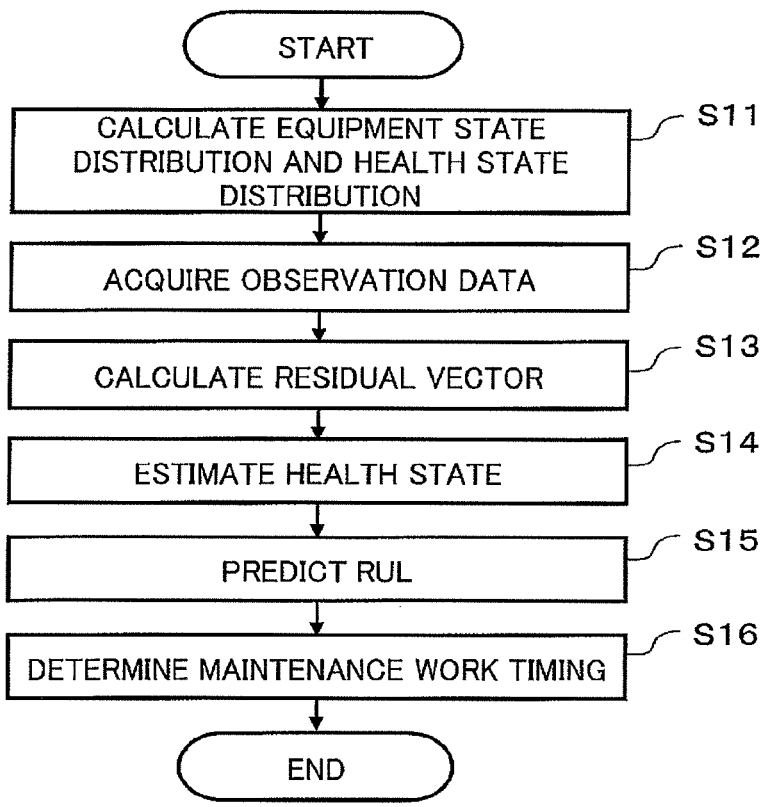
FIG. 23 is a flowchart illustrating the flow of RUL prediction process in the health management system according to the first embodiment of the present invention.

As illustrated in FIG. 23, health management system 1 calculates equipment state distribution and health state distribution through health state prediction unit 13 using past data indicating normal state accumulated in time-series database storage unit 12 (step S11). Although a specific process in step S11 is described below, in step S11, health management system 1 even calculates the similarity indicating the relationship between the equipment state distribution and the health state distribution through health state prediction unit 13. The calculated similarity data (similarity matrix illustrated in FIG. 16) is stored in similarity data storage unit 137.

Next, health management system 1 acquires observation data from mechanical equipment through time-series data acquisition unit 11 (step S12).

Next, health management system 1 calculates a residual vector (or a multi-dimensional vector extending from the normal state to the fault state by a procedure other than the LSC method) targeted for substantially all sensor data for the observation data acquired in step S12 through first discrimination unit 133a in health state prediction unit 13 (step S13).

In the calculation of the residual vector, health management system 1 selects predetermined pieces of past data similar to the observation data from time-series database storage unit 12 through similar time-series data selection unit 131. The selected past data is used as learning data for calculating the residual vector by first discrimination unit 133a.

Next, health management system 1 estimates the health state of the mechanical equipment through health state estimation unit 138 using the starting point data of the residual vector calculated in step S13 and the similarity data calculated in step S11 (step S14). The estimated value of the health state is stored as time-series data in health state storage unit 139.

In parallel with step S11, health management system 1 detects a fault sign through fault sign detection unit 16 by determining whether a fault measure exceeds a predetermined threshold with the length of the residual vector calculated in step S13 as the fault measure. Health management system 1 displays and/or outputs to the outside the detected result of the fault sign through output unit 15.

Next, health management system 1 calculates the predicted value of the RUL through RUL calculation unit 141 by analyzing the trend of changes in time-series data on the health state estimated value stored in health state storage unit 139 (step S15). In parallel with RUL calculation, health management system 1 analyzes the transition of the time-series data on the health state estimated value stored in health state storage unit 139 and calculates the recovery effect of the latest maintenance work on the health state through maintenance effect calculation unit 142.

It is preferred that the RUL prediction process be carried out after checking the recovery effect every maintenance work. That is, it is preferred to check the recovery of the health state after the maintenance work to form the maximum (peak). This allows health management system 1 to predict RUL more accurately.

Next, health management system 1 determines the next maintenance work timing on the basis of the RUL predicted value calculated in step S15 through maintenance timing determination unit 143 (step S16). When the maintenance work timing is set in advance, health management system 1 changes the timing to a suitable timing within a period until the RUL predicted value through maintenance timing determination unit 143. When the RUL is predicted at some point in the past and registered in a storage unit (not shown), the registered value is updated with the latest RUL predicted value.

Although the calculated value of the recovery effect of the last maintenance work is not essential for determining the maintenance work timing, the recovery effect of the next maintenance work can be predicted with reference to the calculated value of the recovery effect as a history of the recovery effect of each maintenance work. Referring to this calculated value together with the transition of the health state, the next maintenance work timing can be determined more properly.

[Calculation Process of Equipment State Distribution and Health State Distribution]

A specific process of calculation process step S11 of the equipment state distribution and health state distribution as illustrated in FIG. 23 will be described with reference to FIG. 24 (with reference to FIGS. 3, 17, and 23 as necessary).

Figure 24:
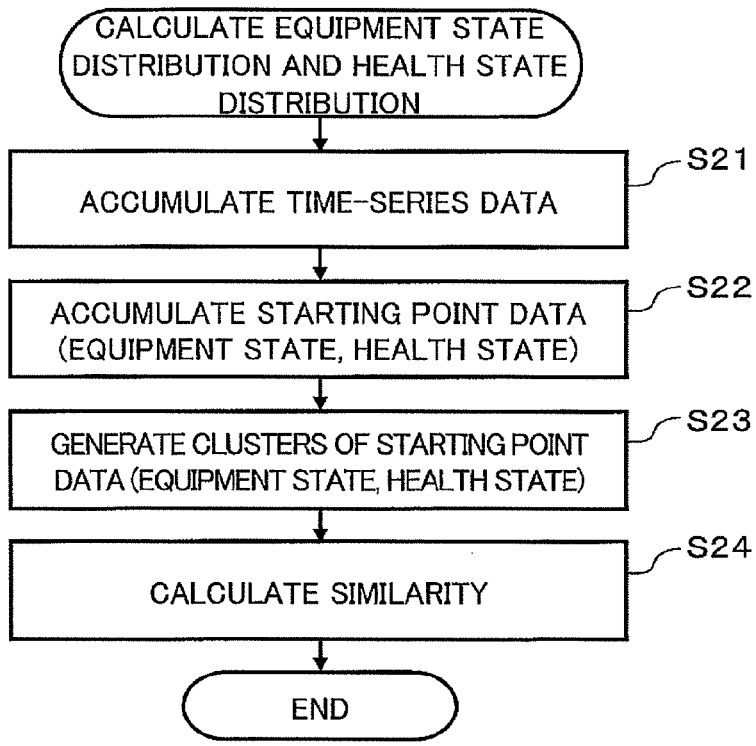
FIG. 24 is a flowchart illustrating the flow of a calculation process of the equipment state distribution and the health state distribution in the flowchart illustrated in FIG. 23.

As illustrated in FIG. 24, first, health management system 1 acquires time-series data including multi-dimensional sensor data from mechanical equipment through time-series data acquisition unit 11, and allows a certain volume of data indicating normal state to be accumulated in time-series database storage unit 12 (step S21). The normal data accumulated in time-series database storage unit 12 is used as past data.

Next, health management system 1 calculates residual vectors using the past data accumulated in step S21 through first discrimination unit 133a and second discrimination unit 133b, respectively, and allows the starting point data of the calculated residual vectors to be accumulated as data indicating the equipment state distribution and health state distribution in respective first starting point data storage unit 134a and second starting point data storage unit 134b (step S22).

First discrimination unit 133a here calculates a residual vector for substantially all sensor data in the past data. Second discrimination unit 133b selects beforehand two or more pieces of sensor data which make a large contribution to the variation of specific performance or quality to be evaluated as the health state in the past data, and calculates residual vectors for the selected pieces of sensor data.

The sensor data used in first discrimination unit 133a and second discrimination unit 133b may be the independent component transformed in feature transformation unit 1331 (see FIG. 18), or the trend component extracted in trend extraction unit 1332 (see FIG. 18), or the like.

Next, health management system 1 clusters the starting point data of the residual vector accumulated in step S22 to generate clusters through first cluster generation unit 135a and second cluster generation unit 135b (step S23).

The data on the produced clusters may be stored in a storage unit (not shown).

Next, health management system 1 calculates the similarity data (for example, the similarity matrix illustrated in FIG. 16) indicating the relationship between the clusters of the equipment state distribution and the respective clusters of the health state distribution, which are generated in step S23, through similarity calculation unit 136 (step S24).

The calculated similarity data is stored in similarity data storage unit 137.

Second Embodiment

[Configuration of Health Management System]

Next, the configuration of health management system 1A according to a second embodiment of the present invention will be described with reference to FIG. 25 (with reference to FIG. 3 as necessary).

Figure 17:
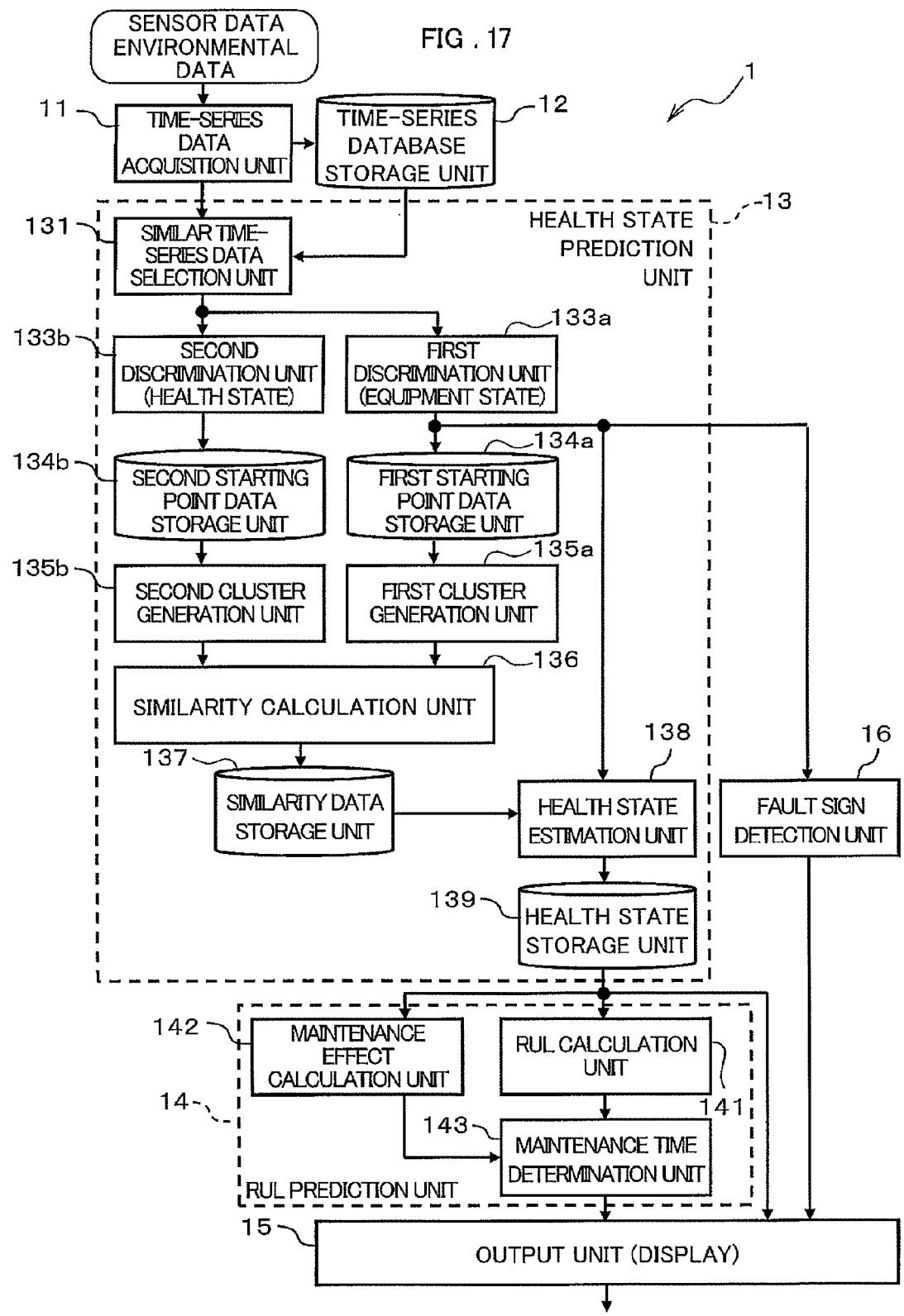
FIG. 17 is a block diagram illustrating the specific configuration of major units of the health management system according to the first embodiment of the present invention.
Figure 25:
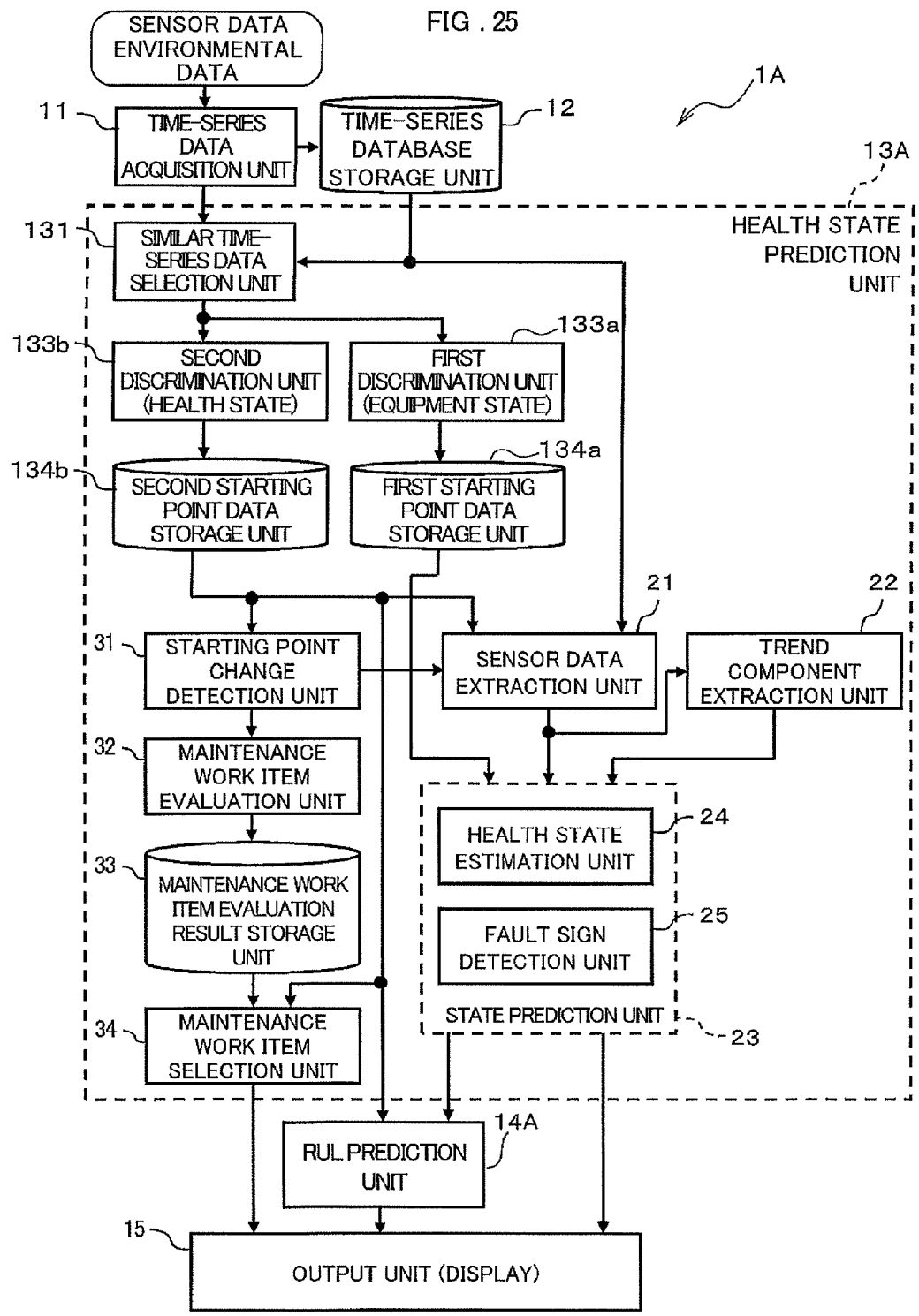
FIG. 25 is a block diagram illustrating a specific configuration of major units of the health management system according to the second embodiment of the present invention.

As illustrated in FIG. 25, health management system 1A according to the second embodiment is different from health management system 1 according to the first embodiment illustrated in FIG. 17 in including health state prediction unit 13A instead of health state prediction unit 13. Like components, as in the first embodiment, are designated by like signs and like names, and the description thereof is appropriately omitted.

Health state prediction unit 13A in this embodiment predicts current or future health state by analyzing the locus of the starting points of residual vectors (or different multi-dimensional vectors extending from the normal state to the fault state) calculated using time-series data obtained by selecting pieces of sensor data which have a large effect on the health state. Health state prediction unit 13A extracts pieces of sensor data which have a large effect on changes in the starting point, when the starting point position indicating the health state changes by a predetermined value or more in a period before and after a maintenance work, and predicts the health state using the pieces of sensor data. This allows more accurate prediction of the health state.

Furthermore, health state prediction unit 13A correlates the variation of the starting point position indicating the health state in a period before and after the maintenance work with work items carried out in the maintenance work to evaluate the effectiveness of the work items on the recovery of the health state, and accumulates the evaluation results. The accumulated data on the evaluation results is then used for selecting work items effective for recovering the health state in the next and subsequent maintenance works.

For this reason, health state prediction unit 13A includes similar time-series data selection unit 131, first discrimination unit 133a, second discrimination unit 133b, first starting point data storage unit 134a, second starting point data storage unit 134b, sensor data extraction unit 21, trend component extraction unit 22, state prediction unit 23, starting point change detection unit 31, maintenance work item evaluation unit 32, maintenance work item evaluation result storage unit 33, and maintenance work item selection unit 34. State prediction unit 23 includes health state estimation unit 24 and fault sign detection unit 25.

Similar time-series data selection unit 131, first discrimination unit 133a, second discrimination unit 133b, first starting point data storage unit 134a, and second starting point data storage unit 134b are the same as those in health state prediction unit 13 in the first embodiment illustrated in FIG. 7, and thus the description is omitted.

Sensor data extraction unit 21 receives from starting point change detection unit 31 the detected result indicating whether the variation of the starting point indicating the health state is a predetermined value or more, while receiving the time-series data on the starting point indicating the health state from second starting point data storage unit 134b and receiving time-series sensor data from time-series database storage unit 12. Sensor data extraction unit 21 then performs comparative analysis between the time-series sensor data and the time-series data on the starting point indicating the health state when the input detected result shows that the variation of the starting point indicating the health state is a predetermined value or more, and identifies sensor data that controls the behavior of the starting point in the period while the variation is a predetermined value or more.

Sensor data extraction unit 21 outputs the time-series data on the identified sensor data to trend component extraction unit 22 and state prediction unit 23.

Sensor data extraction unit 21 outputs the identified sensor data to RUL prediction unit 14A via state prediction unit 23. Furthermore, sensor data extraction unit 21 outputs the identified sensor data to output unit 15, and the output sensor data may be graphically displayed as the data indicating the transition of the health state.

Sensor data extraction unit 21 can extract as such sensor data, for example, sensor data (or may be an independent component or trend component) associated with changes in time-series data on the starting point by calculating the correlation between time-series data sets.

Sensor data extraction unit 21 may refer to the time-series data on the starting point indicating the equipment state stored in first starting point data storage unit 134a, instead of the time-series data on starting point indicating the health state.

Trend component extraction unit 22 receives the time-series data on sensor data that controls the behavior of the health state from sensor data extraction unit 21, and extracts a trend component for changes by analyzing the time-series data.

Instead of the sensor data, trend component extraction unit 22 may extract a trend component by analyzing time-series data on the starting point whose behavior is controlled by the sensor data.

The trend component here is similar to slopes 207 and 208 in the time-series data on the health state illustrated in FIG. 23. The trend component is not limited to the first derivative but may be that including higher-order differential coefficient or a parameter indicating other changes.

State prediction unit 23 predicts the health state of the mechanical equipment while detecting a fault sign of the mechanical equipment. State prediction unit 23 thus includes health state estimation unit 24 and fault sign detection unit 25.

Health state estimation unit 24 receives the time-series data on sensor data that controls the behavior of the starting point indicating the health state from sensor data extraction unit 21, while receiving the trend component for the sensor data from trend component extraction unit 22 to predict the health state.

The prediction of the health state using the trend component here can be carried out in the same manner as in the calculation of limit timing 203 described with reference to FIG. 22. For example, by extrapolating from the present time to the timing to predict the health state using slope 208, which is a trend component, the health state at this timing can be calculated.

In this way, the health state at any timing can be predicted.

Fault sign detection unit 25 receives the time-series data on the starting point indicating the equipment state from first starting point data storage unit 134a, and detects the presence of a fault sign.

Specifically, fault sign detection unit 25 predicts the timing at which the starting point indicating the equipment state accumulated in first starting point data storage unit 134a reaches a predetermined threshold level with reference to the time-series data on the starting point, and determines that there is a fault sign when the time until the prediction day is shorter than a predetermined time and determines that there is no fault sign when the time until the prediction day is equal to or longer than a predetermined time. Fault sign detection unit 25 then outputs this determined result as the detected result of the fault sign to output unit 15.

Fault sign detection unit 25 is not limited to detection of a fault sign with reference to the time-series data on the starting point. For example, fault sign detection unit 25 may be configured to determine that there is a fault sign when the length of a residual vector calculated by first discrimination unit 133a is longer than a predetermined threshold, and determine that there is no fault sign when the length of the residual vector is equal to or shorter than a predetermined threshold.

Starting point change detection unit 31 receives the time-series data on the starting point indicating the health state from second starting point data storage unit 134b, and calculates the variation which is a range of vibration of the starting point position over a predetermined period before and after the maintenance work, while detecting whether the variation is equal to or more than a predetermined position. Starting point change detection unit 31 outputs the detected result to sensor data extraction unit 21 while outputting the detected result and the calculated variation to maintenance work item evaluation unit 32.

Starting point change detection unit 31 can acquire the date and time of the maintenance work with reference to maintenance history data 12e stored in time-series database 12.

Maintenance work item evaluation unit 32 receives the variation of the starting point indicating the health state, and the detected result indicating whether the variation is equal to or more than a predetermined value from starting point change detection unit 31, and correlates work items carried out in the maintenance work with the variation of the starting point position detected by starting point change detection unit 31 to evaluate the effectiveness of the work items. Starting point change detection unit 31 allows the evaluation results on the effectiveness of the work items to be accumulated in maintenance work item evaluation result storage unit 33.

Maintenance work item evaluation unit 32 can acquire the work items carried out the maintenance work with reference to maintenance history data 12e stored in time-series database 12.

Maintenance work item evaluation result storage unit 33 accumulates the evaluation results on the work items evaluated by maintenance work item evaluation unit 32. The evaluation results on the work items accumulated in maintenance work item evaluation result storage unit 33 is referred to by work item selection unit 34.

Maintenance work item selection unit 34 receives the time-series data on the starting point indicating the health state from second starting point data storage unit 134b, while selecting work items effective in current health state to carry out the maintenance work with reference to the evaluation results indicating the effectiveness of maintenance work items accumulated in maintenance work item evaluation result storage unit 33.

Maintenance work item selection unit 34 outputs the selected work items to output unit 15.

Starting point change detection unit 31, maintenance work item evaluation unit 32, maintenance work item evaluation result storage unit 33, and maintenance work item selection unit 34 in this embodiment may be mounted in health management system 1 according to the first embodiment illustrated in FIG. 17, and subjected to work item selection for the maintenance work.

RUL calculation unit 14A in this embodiment receives the time-series data on the sensor data extracted by sensor data extraction unit 21 via health state estimation unit 24, and calculates the RUL and the maintenance effect and further determines the maintenance timing by analyzing the locus of the time-series sensor data. The specific configuration of RUL calculation unit 14A is the same as RUL prediction unit 14 in the first embodiment, and thus the description is omitted.

In the RUL calculation, the time-series data on the starting point indicating the health state stored in second starting point data storage unit 134b may be used instead of, or in addition to the sensor data.

[Prediction Process of Health State]

Next, the prediction process of the health state (for example, performance) by health management system 1A according to the second embodiment of the present invention will be described with reference to FIG. 26 (with reference to FIGS. 3 and 25 as necessary).

Figure 26:
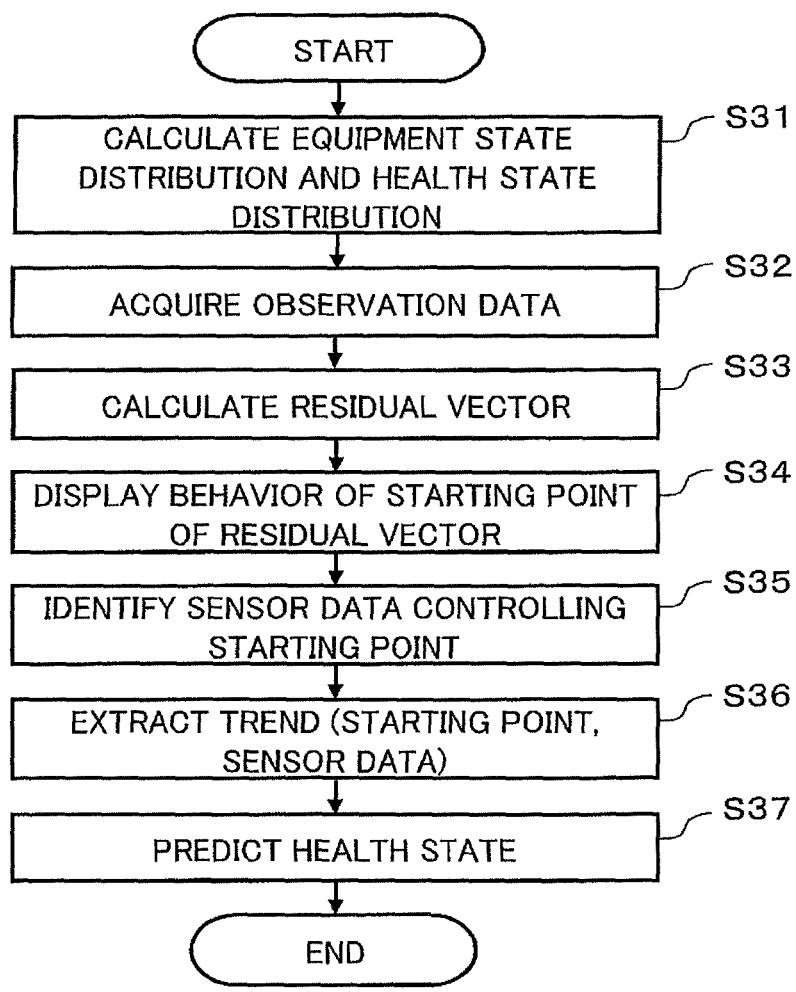
FIG. 26 is a flowchart illustrating the flow of a health state prediction process in the health management system according to a modification of the second embodiment of the present invention.

As illustrated in FIG. 26, health management system 1A calculates equipment state distribution and health state distribution through health state prediction unit 13A using past data indicating normal state accumulated in time-series database storage unit 12 (step S31). This process corresponds to the process from steps S21 to S23 illustrated in FIG. 24. It is noted that calculation of the similarity (step S24) is not always necessary.

Next, health management system 1A acquires observation data from mechanical equipment through time-series data acquisition unit 11 (step S32).

Next, health management system 1A calculates a residual vector (or a multi-dimensional vector extending from the normal state to the fault state by a procedure other than the LSC method) for the observation data acquired in step S32, through first discrimination unit 133a and second discrimination unit 133b in health state prediction unit 13A (step S33). The starting point data of the residual vector calculated in first discrimination unit 133a and second discrimination unit 133b is stored as time-series data on the starting point in first starting point data storage unit 134a and second starting point data storage unit 134b, respectively.

First discrimination unit 133a here calculates a residual vector for substantially all sensor data in the observation data. Second discrimination unit 133b selects beforehand two or more pieces of sensor data which make a large contribution to the variation of specific performance or quality to be evaluated as the health state in the observation data, and calculates residual vectors for the selected pieces of sensor data.

The sensor data used in first discrimination unit 133a and second discrimination unit 133b may be the independent component transformed in feature transformation unit 1331 (see FIG. 18), or the trend component extracted in trend extraction unit 1332 (see FIG. 18), or the like.

Next, health management system 1A displays the time-series data on the starting point stored in first starting point data storage unit 134a and/or second starting point data storage unit 134b, through output unit 15, so as to show the transition of changes, or the behavior of the time-series data (for example, see FIG. 20) (step S34). In this case, it is preferred to display the acquisition time of the observation data corresponding to the starting point at each starting point position or to provide shade display or color-coded display according to the acquisition time so as to show the transition of transformation on a time-series basis.

Health management system 1A calculates the variation of the starting point position over a period before and after the maintenance work through starting point change detection unit 31, while detecting whether the variation is equal to or more than a predetermined value. Furthermore, health management system 1A correlates the work items carried out in the maintenance work with the variation of the starting point position detected by starting point change detection unit 31 to evaluate the effectiveness of the work items through maintenance work item evaluation unit 32. In health management system 1A, starting point change detection unit 31 allows the evaluation result on the effectiveness of the work items to be accumulated in maintenance work item evaluation result storage unit 33.

Next, health management system 1A selects work items effective for recovering the health state through maintenance work item selection unit 34 with reference to current health state and the evaluation results for each work item of the work accumulated in maintenance work item evaluation result storage unit 33 in order to carry out the maintenance work. Health management system 1A then displays the selected work items through output 15.

Next, health management system 1A performs comparative analysis between the time-series data on the starting point stored in first starting point data storage unit 134a and/or second starting point data storage unit 134b and the time-series sensor data stored in time-series database storage unit 12 to identify sensor data that controls the behavior of the starting point through sensor data extraction unit 21, when starting point change detection unit 31 detects that the variation of the starting point position is equal to or more than a predetermined value (step S35).

Next, health management system 1A extracts the trend component of changes by analyzing the time-series data on the sensor data identified in step S35 through trend component extraction unit 22 (step S36).

Next, health management system 1A predicts future health state through health state estimation unit 24 using the trend component extracted in step S36 (step S37).

Health management system 1A detects a fault sign by analyzing the time-series data on the starting point indicating the equipment state calculated in step S33 and accumulated in first starting point data storage unit 134a, through fault sign detection unit 25. Health management system 1A displays the detected result of the fault sign through output unit 15.

(Modifications)
[Configuration of Health Management System]

Next, the configuration of health management system 1B according to a modification of the first embodiment of the present invention will be described with reference to FIG. 27 (with reference to FIGS. 3 and 17 as necessary).

Figure 27:
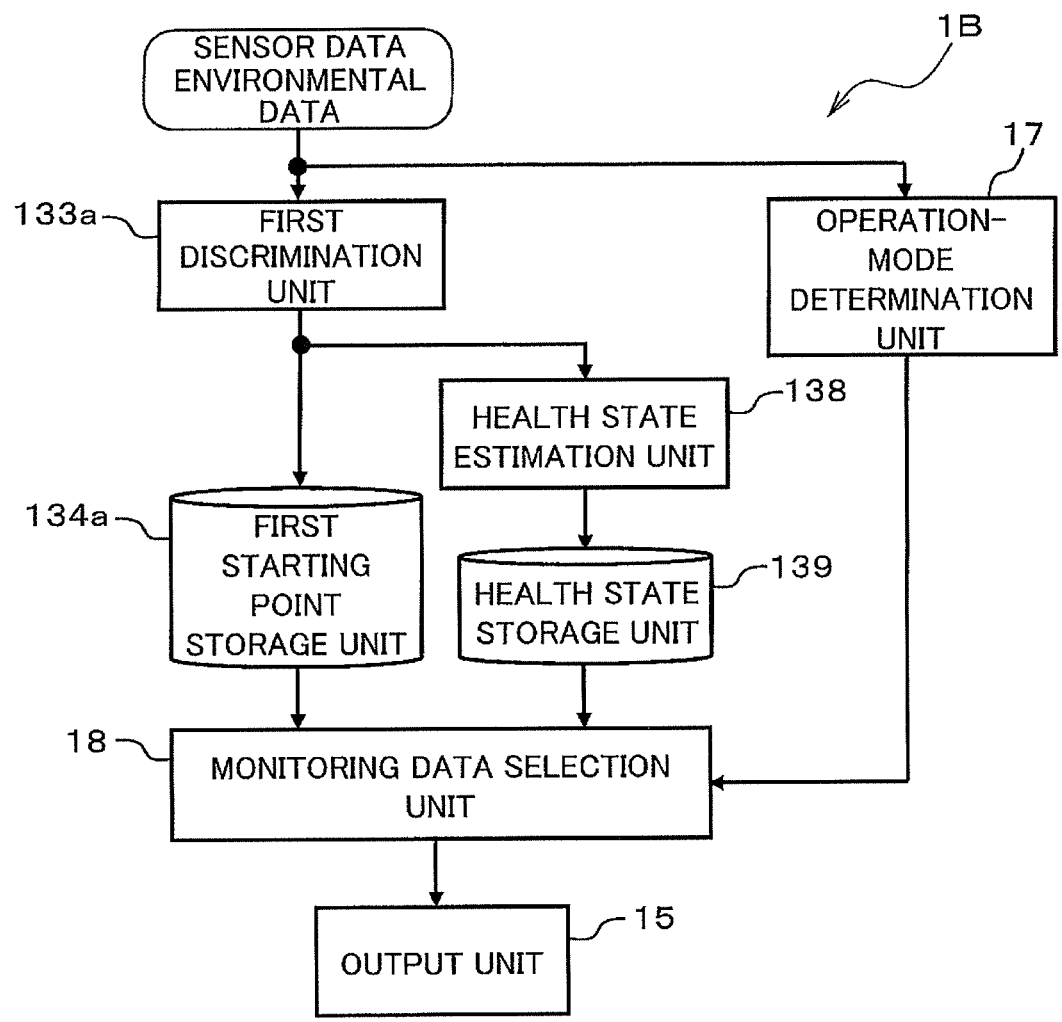
FIG. 27 is a block diagram illustrating major units of the health management system according to a modification of the present invention.

As illustrated in FIG. 27, health management system 1B according to this modification is different from health management system 1 illustrated in FIG. 17 in further including operation-mode determination unit 17 and monitoring data selection unit 18. Other components are the same as those in health management system 1, and thus components relevant to added operation-mode determination unit 17 and monitoring data selection unit 18 are described and the description of other components is omitted in FIG. 27.

Health management system 1B in this modification switches time-series data displayed on output unit 15 between time-series data indicating the equipment state and time-series data indicating the health state according to the operation mode of mechanical equipment to be monitored. This allows the behavior of the mechanical equipment to be monitored more properly.

Operation-mode determination unit 17 determines the operation mode of the mechanical equipment to be monitored. Operation-mode determination unit 17 outputs information indicating the determined operation mode to monitoring data selection unit 18.

The operation mode here is determined, for example, by event data 12b (see FIG. 4) included as environmental data acquired by time-series data acquisition unit 11. The operation mode can be also determined by analyzing the behavior of time-series sensor data 12a.

Monitoring data selection unit 18 receives the information indicating the operation mode of the mechanical equipment from operation-mode determination unit 17, and selectively outputs to output unit 15 time-series data on the starting point indicating the equipment state accumulated in first starting point data storage unit 134a and the time-series data on the estimated value of the health state (performance and quality) accumulated in health state storage unit 139 according to the operation mode indicated by the information.

Output unit 15 displays the time-series data received from monitoring data selection unit 18 so as to enable easy visual recognition of the locus of the starting point data and the transition of the health state, for example, as illustrated in FIGS. 20 and 22.

The example illustrated in FIG. 27 is a modification of the first embodiment, but can be also applied to health management system 1A according to the second embodiment.

When a power shovel, mining machine, is described as an example, combination of the equipment state and the performance, which is the health state, as time-series data to be displayed is more effective. As illustrated below, state monitoring and performance monitoring of mechanical equipment can be used separately according to the operation mode (pattern) of the mechanical equipment.

(1) State monitoring during warming-up operation.
(2) Performance monitoring during normal driving.
  (set transmission information, engine revolution number and speed)
(3) State monitoring for occasional temporary stop during normal driving.
  (accelerator pedal full close in normal operation after warming-up operation)

State monitoring and Performance monitoring can be selected depending on "warming-up operation", "normal driving", and "temporary stop", which are operation modes of the power shovel. The "state monitoring" is carried out by placing more weight on monitoring variations in revolution number or the like during warming-up operation, while the "performance monitoring" is carried out by placing more weight on the relationship between transmission information and engine revolution number and speed or the like during normal driving. This proper use allows mechanical equipment to be monitored effectively depending on the purpose and the mode.

The embodiments and their modifications of the health management system of the present invention are described above. These embodiments and the like enable visual expression of changes in equipment state and changes in health state. The system thus can assist an operator who monitors mechanical equipment using the system to determine the urgency by observing how the equipment state and health state change in consideration of the time interval of whether the change accelerates or decelerates. Therefore, the system can estimate the RUL of how long the mechanical equipment can withstand and can adjust the maintenance timing set or substantially fixed by the scheduled maintenance to earlier or later timing that is more proper for the mechanical equipment on the basis of this remaining useful life. The RUL estimation can be also automatically carried out with the system by analyzing displayed data visually recognized by an operator. This timing can be estimated in advance, which facilitates scheduling, such as preparation of components for the maintenance work, arrangement of workers, and preparation of jigs. Moreover, the health state can be identified through the monitoring during the operation of mechanical equipment, and thus work items of the maintenance work can be selected in advance, which reduces the work hours fixed by the scheduled maintenance. This reduces the down time of mechanical equipment.

The present invention is not limited to the above-mentioned embodiments and includes various modifications. For example, the above-mentioned embodiments are described in detail to easily understand the present invention, and the present invention is not limited to those including all the components described above. Some components of one embodiment can be displaced by components of another embodiment, and components of one embodiment can be also added to components of another embodiment. Addition, deletion, and/or substitution of other components may be conducted on some components in each embodiment.

Some of or all the configurations, functions, process units, processing means, or the like as described above may be realized with hardware, for example, by designing them with an integrated circuit or so. The configurations, functions, or the like as described above may be realized with software by allowing a processor to interpret programs that realize respective functions and execute them. Information on the programs that realize respective functions, tapes, files, or the like can be stored in recording devices, such as memories, hard disks, and solid-state drives (SSDs), or recording media, such as IC cards, SD cards, and DVDs.

Control lines and information lines which are considered necessary for description are illustrated, and all control lines or information lines on products are not illustrated. Substantially all components may be mutually connected in fact.

REFERENCE SIGNS LIST 1, 1A, 1B Health management system (Fault diagnosis system)
11 Time-series data acquisition unit
12 Time-series database storage unit
12a Sensor data
12b Event data (Environmental data)
12c Operation data (Environmental data)
12d Load data (Environmental data)
12e Maintenance history data (Environmental data)
13, 13A Health state prediction unit
131 Similar time-series data selection unit
133a First discrimination unit (State quantification unit)
133b Second discrimination unit (State quantification unit)
1331 Feature transformation unit
1332 Trend extraction unit
1333 Learning data selection unit
1334 Discriminator
134a First starting point data storage unit
134b Second starting point data storage unit
135a First cluster generation unit
135b Second cluster generation unit
136 Similarity calculation unit
137 Similarity data storage unit
138 Health state estimation unit
139 Health state storage unit
14 RUL prediction unit (Remaining useful life estimation unit)
141 RUL calculation unit
142 Maintenance effect calculation unit
143 Maintenance timing determination unit
15 Output unit
16 Fault sign detection unit
17 Operation-mode determination unit
18 Monitoring data selection unit
21 Sensor data extraction unit
22 Trend component extraction unit
23 State prediction unit
24 Health state estimation unit
25 Health state storage unit
26 Fault sign detection unit
31 Starting point change detection unit
32 Maintenance work item evaluation unit
33 Maintenance work item evaluation result storage unit
34 Maintenance work item selection unit
101 Fault measure
102 Threshold
103 Limit timing
104 RUL
105a to 105d Mechanical equipment
201 Health state
202 Threshold
203 Limit timing
204 RUL
205 Load factor/operating rate
207, 208 Slope
206 Probability density
209 Recovery effect (Recovery amount)
210 Alarm
211 Maintenance work

The invention claimed is:

1. A fault diagnosis computer system for diagnosing a fault of mechanical equipment, comprising:
a processor; and
a memory storing instructions that, when executed by the processor, cause the computer system to:
acquire as time-series data, sensor data from a plurality of sensors installed in the mechanical equipment, or the sensor data and environmental data indicating an installation environment of the mechanical equipment;
calculate a multi-dimensional vector extending from a normal state to a fault state of the mechanical equipment by a statistical method using the time-series data as learning data;
estimate an equipment state or health state of the mechanical equipment using the multi-dimensional vector;
detect whether a starting point position of the multi-dimensional vector changes by a predetermined value or more to determine a recovery effect of a maintenance work on the health state, wherein the multi-dimensional vector is calculated from time-series data in a period before and after the maintenance work is performed on the mechanical equipment;

extract from the time-series data, sensor data that contributes to the change in the starting point position of the multi-dimensional vector;

analyze changes in health state based on the time-series data on the health state to determine an estimated time period from a present time to an estimated time at which the health state decreases below a predetermined threshold;

determine a time at which maintenance work is to be next conducted based on the estimated time period received and the recovery effect of the maintenance work on the health state received;

display the extracted sensor data as an index indicating the health state of the mechanical equipment; and direct performance of maintenance work, wherein the environmental data, if included in the time-series data, includes at least one type of data among event data indicating an operation state of the mechanical equipment, operation data indicating an operation time of the mechanical equipment, load data indicating a load state of the mechanical equipment, and maintenance history data indicating a history of the maintenance work of the mechanical equipment.

2. The fault diagnosis computer system of claim 1, further comprising:

transforming a feature of the time-series data through independent component analysis of the time-series data, and wherein the calculating of the multi-dimensional vector is via the transformed time-series data.

3. The fault diagnosis computer system of claim 2, further comprising:

extracting a trend component indicating a tendency of a change for the time-series data, and wherein the calculating of the multi-dimensional vector is via the time-series data including the trend component.

4. The fault diagnosis computer system of claim 3, further comprising:

calculating, in performing the independent component analysis on the time-series data, a weight from a mixing coefficient matrix indicating a relationship between the time-series data and an independent component, and controlling the size of a signal of the independent component using the weight.

5. The fault diagnosis computer system of claim 3, wherein the statistical method is any one of a Gaussian process, any other regression procedure, a k-nearest neighbor (k-NN) method, a local subspace method, and any other recognition procedure, and wherein the fault diagnosis computer system further displays the starting point of the multi-dimensional vector so as to enable visual recognition of the change in the starting point on a time-series basis.

6. The fault diagnosis computer system of claim 2, further comprising:

calculating, in performing the independent component analysis on the time-series data, a weight from a mixing coefficient matrix indicating a relationship between the time-series data and an independent component, and controlling the size of a signal of the independent component using the weight.

7. The fault diagnosis computer system of claim 6, wherein the statistical method is any one of a Gaussian process, any other regression procedure, a k-nearest neighbor (k-NN) method, a local subspace method, and any other recognition procedure, and wherein the fault diagnosis computer system further displays the starting point of the multi-dimensional vector so as to enable visual recognition of the change in the starting point on a time-series basis.

8. The fault diagnosis computer system of claim 2, wherein the statistical method is any one of a Gaussian process, any other regression procedure, a k-nearest neighbor (k-NN) method, a local subspace method, and any other recognition procedure, and wherein the fault diagnosis computer system further displays the starting point of the multi-dimensional vector so as to enable visual recognition of the change in the starting point on a time-series basis.

9. The fault diagnosis computer system of claim 1, further comprising:

displaying the starting point of the multi-dimensional vector so as to enable visual recognition of the change in the starting point on a time-series basis, and wherein the statistical method is any one of a Gaussian process, any other regression procedure, a k-nearest neighbor (k-NN) method, a local subspace method, and any other recognition procedure.

10. A fault diagnosis method for diagnosing a fault of mechanical equipment, the method comprising:

a time-series data acquisition step of acquiring, as time-series data, sensor data from a plurality of sensors installed in the mechanical equipment, or the sensor data and environmental data indicating an installation environment of the mechanical equipment;

a multi-dimensional vector calculation step of calculating a multi-dimensional vector extending from a normal state to a fault state of the mechanical equipment by a statistical method using the time-series data as learning data;

a state estimation step of estimating an equipment state or health state of the mechanical equipment using the multi-dimensional vector;

a starting point change detection step of detecting whether the starting point position of the multi-dimensional vector calculated in the multi-dimensional vector calculation step changes by a predetermined value or more to determine a recovery effect of a maintenance work on the health state, the multi-dimensional vector calculated from time-series data acquired in the time-series data acquisition step in a period before and after a maintenance work is performed on the mechanical equipment;

a sensor data extraction step of extracting, from the time-series data, sensor data that contributes to the change in the starting point position of the multi-dimensional vector;

a remaining useful life calculation step of analyzing changes in health state based on the time-series data on the health state to determine an estimated time period from a present time to an estimated time at which the health state decreases below a predetermined threshold;

a maintenance timing determination step of determining a time at which maintenance work is to be next conducted based on the estimated time period and the recovery effect of the maintenance work on the health state;

an output step of displaying or outputting to an outside the extracted sensor data as an index indicating the health state of the mechanical equipment; and a directing step for directing the performance of maintenance work, wherein the environmental data includes at least one type of data among event data indicating an operation state of the mechanical equipment, operation data indicating an operation time of the mechanical equipment, load data indicating a load state of the mechanical equipment, and maintenance history data indicating a history of the maintenance work of the mechanical equipment.

* * * * *